(12) United States Patent
Sommerfeld et al.

(10) Patent No.: US 8,231,313 B2
(45) Date of Patent: Jul. 31, 2012

(54) ADJUSTABLE HOLDING SYSTEM

(75) Inventors: Craig A Sommerfeld, Kelley, IA (US); Scott L Clark, Boone, IA (US)

(73) Assignee: Allen IP, Incorporated, Huxley, IA (US)

(*) Notice: Subject to any disclaimer, the term of this patent is extended or adjusted under 35 U.S.C. 154(b) by 467 days.

(21) Appl. No.: 11/947,722

(22) Filed: Nov. 29, 2007

(65) Prior Publication Data
US 2008/0219786 A1    Sep. 11, 2008

Related U.S. Application Data

(63) Continuation of application No. 11/104,276, filed on Apr. 12, 2005, now Pat. No. 7,641,425.

(51) Int. Cl.
*B23B 47/28* (2006.01)

(52) U.S. Cl. ............ 408/115 R; 408/67; 408/103

(58) Field of Classification Search .......... 408/67, 408/72 B, 95, 97, 103, 115 R, 115 B, 241 B; 269/224
See application file for complete search history.

(56) References Cited

U.S. PATENT DOCUMENTS

| | | |
|---|---|---|
| 1,128,970 A | 2/1915 | Godefroy |
| 1,153,841 A | 9/1915 | Earle |
| 1,401,262 A | 12/1921 | Kranz |
| 1,576,463 A | 3/1929 | Pope |
| 1,890,664 A | 12/1932 | Alden |
| 1,919,900 A | 7/1933 | Moller |
| 2,181,746 A | 11/1939 | Siebrandt |
| 2,260,784 A | 10/1941 | Morton |
| 2,268,930 A | 1/1942 | Edwards |
| 2,467,600 A | 4/1949 | Shipley |
| 2,490,718 A | 12/1949 | Stellin |
| 2,519,468 A | 8/1950 | Hengst |
| 2,522,400 A | 9/1950 | Polkosnik |
| 2,527,968 A * | 10/1950 | Sherman et al. ............ 408/14 |
| 2,602,238 A | 7/1952 | Wellman |
| 2,674,907 A | 4/1954 | Zoll |
| 2,843,167 A | 7/1958 | Rushton |
| 3,263,531 A | 8/1966 | Sammons et al. |
| 3,306,137 A | 2/1967 | Mele |

(Continued)

FOREIGN PATENT DOCUMENTS

CA    2506924 A1    12/2005
(Continued)

OTHER PUBLICATIONS

Danny Proulx, "The Pocket Hole Drilling Jig Project Book", First Edition, Cincinnati, OH, Popular Woodworking Books, 2004, 3 pages.

(Continued)

*Primary Examiner* — Daniel Howell
(74) *Attorney, Agent, or Firm* — Zarley Law Firm, P.L.C.

(57) ABSTRACT

Adjustable holding systems, as well as methods of using, may include a fixed base adapted for use on a work surface, the fixed base having a rear actuated clamp assembly secured thereto. Other systems and methods may include one or more bases adapted for use on a work surface; and a guide assembly removably securable to the one or more bases, wherein the guide assembly provides infinite vertical adjustability which can be retained without clamping. Yet other systems and methods may include a portable base securable to a work surface, the portable base having a portable base opening.

22 Claims, 32 Drawing Sheets

U.S. PATENT DOCUMENTS

| | | | |
|---|---|---|---|
| 3,386,318 A | | 6/1968 | Pekarcik et al. |
| 3,626,513 A | | 12/1971 | Pytlak |
| 3,630,511 A | * | 12/1971 | Evans et al. ............... 269/43 |
| 3,708,237 A | | 1/1973 | Kruse |
| 4,137,003 A | | 1/1979 | Budoff |
| 4,176,989 A | | 12/1979 | Wolff |
| 4,257,166 A | | 3/1981 | Barker et al. |
| 4,385,755 A | | 5/1983 | Mawer |
| 4,466,601 A | | 8/1984 | Raines |
| 550,767 A | | 12/1985 | Thielscher |
| 4,594,032 A | | 6/1986 | Warburg |
| 4,601,618 A | | 7/1986 | McEldowney |
| 4,715,125 A | | 12/1987 | Livick |
| 4,730,959 A | | 3/1988 | Aemi et al. |
| 4,747,588 A | | 5/1988 | Dillhoff |
| 4,809,424 A | | 3/1989 | Bianchi et al. |
| 4,842,453 A | | 6/1989 | Raines et al. |
| 4,904,130 A | | 2/1990 | Gorman |
| 4,955,766 A | * | 9/1990 | Sommerfeld ............... 408/87 |
| 5,056,966 A | | 10/1991 | Lee |
| 5,076,742 A | | 12/1991 | Lee et al. |
| 5,163,792 A | | 11/1992 | Slavik |
| 5,322,396 A | | 6/1994 | Blacker |
| 5,676,500 A | * | 10/1997 | Sommerfeld ............... 408/103 |
| 5,791,835 A | | 8/1998 | Chiang et al. |
| 5,807,036 A | | 9/1998 | Lostlen |
| 5,954,461 A | | 9/1999 | Lemieux |
| 6,053,674 A | | 4/2000 | Thompson |
| 6,200,075 B1 | * | 3/2001 | Gaskin et al. ............... 408/67 |
| 6,254,320 B1 | | 7/2001 | Weinstein et al. |
| 6,283,685 B1 | | 9/2001 | Lemieux |
| 6,394,712 B1 | | 5/2002 | Weinstein et al. |
| 6,413,022 B1 | | 7/2002 | Sarh |
| 6,481,937 B1 | * | 11/2002 | Sommerfeld et al. .... 408/115 R |
| 6,599,064 B1 | | 7/2003 | Robinson |
| 6,622,997 B2 | | 9/2003 | Emerson |
| 6,637,988 B1 | * | 10/2003 | Park ............... 408/103 |
| 6,659,695 B2 | | 12/2003 | Park |
| 6,726,411 B2 | | 4/2004 | Sommerfeld et al. |
| 6,729,811 B2 | | 5/2004 | Kamphius et al. |
| 6,905,291 B2 | | 6/2005 | Day et al. |
| D528,930 S | | 9/2006 | Degen |
| 7,134,814 B1 | * | 11/2006 | Park ............... 408/103 |
| 7,641,425 B2 | * | 1/2010 | Sommerfeld et al. .... 408/115 R |
| 2002/0150434 A1 | | 10/2002 | Sommerfeld et al. |
| 2003/0123941 A1 | | 7/2003 | Emerson |
| 2004/0141821 A1 | | 7/2004 | Otten |
| 2005/0089381 A1 | * | 4/2005 | Liu et al. ............... 408/115 R |
| 2008/0226406 A1 | * | 9/2008 | Chiang ............... 408/115 R |

FOREIGN PATENT DOCUMENTS

| | | |
|---|---|---|
| DE | 144100 | 10/1912 |
| DE | 8613606 | 7/1986 |
| EP | 1595627 A2 | 11/2005 |
| EP | 1437188 | 11/2007 |
| FR | 2360370 | 3/1978 |
| GB | 431711 | 7/1935 |
| GB | 460965 | 2/1937 |
| GB | 2299774 | 10/1996 |

OTHER PUBLICATIONS

"Pocket-Hole", Wood Magazine, Jan. 1995, pp. 38-40.

"Pocket-Hole Jigs", American Woodworker, Apr. 1999, pp. 84-89.

"Simple Cabinetry with Pocket Screws", The Family Handyman, Oct. 1999, pp. 74-82.

"A Simple Approach to Frame-and-Panel Trim", Fine Homebuilding, Jun./Jul. 2000, pp. 96-99, No. 143.

"Face Frame Assembly" and "In the Shop: Pocket Hole Joinery Proves Its Value", Workbench, Sep./Oct. 2000, pp. 47 and 74, No. 261.

"Kreg's Pocket Hole Jig", Woodworker's Journal, Oct. 2000, pp. 64-67, vol. 24, No. 5.

"Pocket Hole Joinery", Woodsmith, Aug. 2001, pp. 18-21, vol. 23, No. 136.

"Kreg Tool Company: The Woodworker's Emporium", Kreg Tool Product Catalog with A2H—Air Hand Model photo, Order page indicates prices in catalog are good through Aug. 1993, Printed and mailed to customers prior to Aug. 1993, 7 pages.

* cited by examiner

ADJUSTABLE HOLDING SYSTEM

CROSS-REFERENCE TO RELATED APPLICATION

This application is a continuation of application Ser. No. 11/104,276, filed Apr. 12, 2005 now U.S. Pat. No. 7,641,425, entitled "Adjustable Holding Systems And Methods Of Using Same," which is incorporated herein by reference.

FIELD OF THE INVENTION

This invention relates generally to holding systems and, more particularly, to adjustable holding systems and methods of using same.

BACKGROUND OF THE INVENTION

Pocket hole wood joinery involves joining boards by inserting a fastener at an angle through the edge of one board into the other. Such joints are commonly used for face frames, cabinet boxes, leg-to-rail joinery in chairs and tables, and so forth. Drill guides or jigs are used to drill the holes through which the fasteners or pocket screws are inserted into the adjoining workpiece.

Typical jigs or pocket hole devices provide for drilling of specifically sized workpieces with minimal ability to adjust the drill guide height or perhaps adjust it only in set increments. Others which seek to provide infinite height adjustment do not provide any type of locking mechanism to secure the drill guide into position without a clamp. Therefore, once the clamp is released, the drill guide moves out of position such that the drill guide needs to be repositioned with each new workpiece clamped thereto.

Additionally, conventional fixed clamps currently used on pocket hole devices are typically toggle clamps operated proximate to a workpiece. Such designs, however, can be difficult to operate properly, particularly when larger workpieces need to be drilled.

Many drilling projects also require the user to switch between different fixed bases and/or guides or switch from a fixed base to an application requiring a handheld clamp. Many devices on the market today attempt to provide drill guides which can be moved for use in different applications although proper spacing is typically not maintained. For example, conventional guides intended for use with a fixed base are often provided on a rod along which they are free to move when not secured to the fixed base, resulting in loss of previously set hole spacing, thus requiring realignment of the guides with respect to each other. This is not only time-consuming but can lead to inaccurate results. One attempt to solve this problem has been to provide a portable plate into which the guides and rod assembly can be secured. However, as soon as the guides are removed from the portable plate, they are again free to move, thus requiring realignment with respect to each other.

For the reasons stated above, and for other reasons stated below which will become apparent to those skilled in the art upon reading and understanding the present specification, there is a need in the art for an improved adjustable holding system.

BRIEF SUMMARY OF THE INVENTION

An adjustable holding system comprising a fixed base adapted for use on a work surface, the fixed base having a rear actuated clamp assembly secured thereto is provided. In one embodiment, the fixed base is an L-shaped base having a fixed base opening. In one embodiment, the system further comprises a guide assembly insertable into the fixed base opening. In a particular embodiment, the guide assembly has infinite vertical, i.e., height, adjustability. In one embodiment, the system further comprises a portable base having a portable base opening, wherein the guide assembly is also insertable into the portable base opening.

An adjustable holding system comprising one or more bases adapted for use on a work surface; and a guide assembly removably securable to the one or more bases, wherein infinite vertical adjustability which can be retained without clamping is also provided. In one embodiment, a fixed base and one or more portable bases are provided. In one embodiment, at least one fixed base is provided. In one embodiment, at least one portable base is provided. In one embodiment, the one or more bases comprise at least two different bases selected from the group consisting of fixed bases and portable bases.

In one embodiment, the clamp secured to the fixed base is a rear or user-side actuated clamp assembly. In another embodiment, a dust catcher is additionally or alternatively provided with the fixed base to prevent waste material from collecting in the work area. In yet another embodiment, one or more support-stops can be used together with either type of base to provide additional support or a stop as desired. In one embodiment, there are at least three guide channels in the guide assembly having fixed spacing, such as fixed varied spacing, although the invention is not so limited. The guide assembly preferably has a substantially horizontal bottom surface, thus allowing the guide assembly to be used independently of a base on a work surface.

An adjustable holding system comprising a portable base securable to a work surface, the portable base having a portable base opening is also provided. In one embodiment, the portable base has a pair of holders located on a back surface for securing a first retaining disk of a handheld clamp, wherein a second retaining disk is movable into a clamped or unclamped position on the opposing side of the portable base An adjustable holding system comprising at least one portable base having a portable base opening and adapted for use on a work surface, the at least one portable base having a pair of holders for securing a first retaining disk of a handheld clamp on one side of the at least one portable base, wherein a second retaining disk is movable into a clamped or unclamped position on the opposing side of the at least one portable base is also provided. In one embodiment, the pair of holders comprises two rotating knobs under which the first retaining disk is securable. In one embodiment, the system further comprises a guide assembly insertable into the portable base opening wherein infinite vertical adjustability which can be retained without a clamp is provided. In one embodiment, the guide assembly has at least three fixed holes with varied spacing.

Embodiments of the invention also include methods, such as methods of using the adjustable holding systems as well as methods for drilling pocket holes in a workpiece, and the like. In one embodiment, the method comprises providing an adjustable holding system having infinite vertical adjustability which can be retained without a clamp; placing the adjustable holding system on a planar surface; drilling a first hole in the workpiece; and drilling a second hole in the workpiece. In one embodiment, the adjustable holding system has a removable guide assembly insertable into one or more bases. In one embodiment, the one or more bases is a fixed base having a clamp assembly, such as a rear actuated clamp assembly.

In one embodiment, the method comprises providing a fixed adjustable holding system having a rear actuated clamp; securing the fixed system to a planar surface; and drilling a hole in the workpiece. In one embodiment, the method further comprises drilling more than one hole in the workpiece.

In one embodiment, the method comprises providing a portable adjustable holding system securable to a work surface, the portable system having a back surface and a front surface; securing the portable system to the work surface; clamping a workpiece to the portable system with a handheld clamp; and drilling a hole in the workpiece. In one embodiment, the method further comprises drilling another hole in the workpiece.

In one embodiment, the portable system has a back surface and a front surface and the method comprises securing a first retaining disk on a handheld clamp to the back surface, the handheld clamp further having a second retaining disk; placing a workpiece on the front surface; and clamping the workpiece with the second retaining disk. In one embodiment, the method further comprises securing the portable adjustable holding system to the work surface and drilling one or more holes.

In one embodiment, the use of a rear actuated clamp assembly with the fixed base allows users, for the first time, to conveniently clamp a workpiece into place without the need to reach around in front of the workpiece. This feature is particularly useful for larger workpieces. In another embodiment, the additional or alternative use of a dust catcher together with the fixed base keeps the work area clean during operation and reduces cleanup time. In yet another embodiment, a user is able to, for the first time, secure a portable base to a work surface.

Various embodiments of the adjustable holding systems or jigs of the present invention also allow a user, for the first time, to drill pocket holes in materials of various thicknesses using a guide assembly capable of providing essentially vertical adjustability without the need for separate components and further being interchangeable between different bases, such as a portable base and a fixed base. The unique design of various embodiments of the guide assembly and base (i.e., portable base and/or substantially vertical portion of the fixed base) result in a co-planar relationship of the vertical surfaces of both components when the guide assembly is inserted therein, which provides a substantially smooth surface to support a workpiece in one or more drilling environments. In one embodiment, these novel features are combined with a guide assembly having fixed spacing between guide channels, such as fixed varied spacing. Use of fixed spacing eliminates the need to adjust the holding device or workpiece between drilling to obtain the desired spacing between pocket holes.

DETAILED DESCRIPTION

Figure 1:
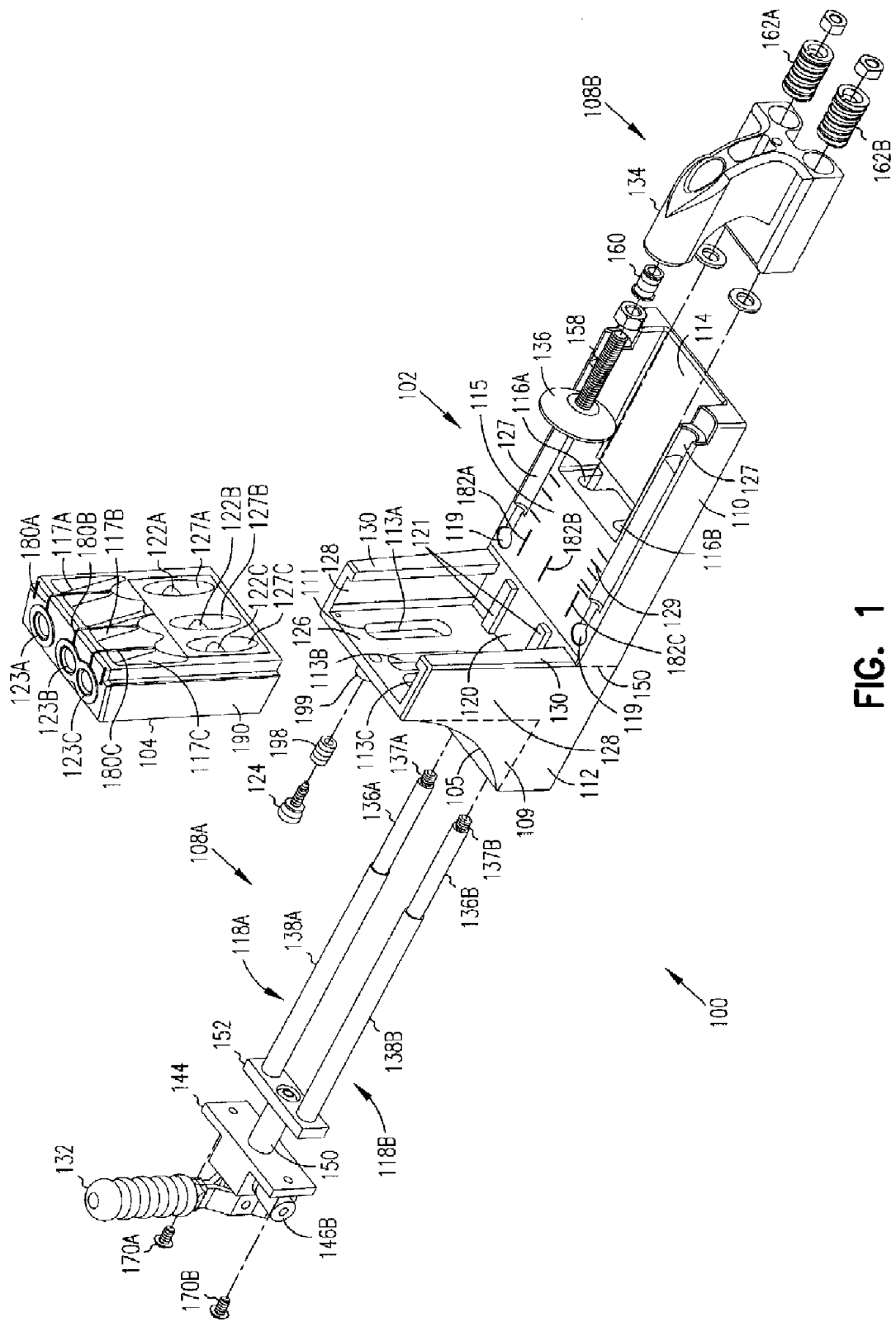
FIG. 1 is an exploded view of an adjustable holding system having a fixed base in one embodiment of the present invention.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

An adjustable holding system is disclosed. In one embodiment, the adjustable holding system comprises a fixed base or a portable base and a guide assembly which cooperate to provide a co-planar surface and infinite vertical adjustability of the guide assembly. In one embodiment, the adjustable holding system comprises at least one fixed base and at least one portable base, which, in combination with a guide assembly inserted therein, provide a co-planar surface and infinite vertical adjustability. In one embodiment, each base is designed for use with the same guide assembly, although other features described herein are also novel, including, but not limited to, the rear-actuated clamp assembly for the fixed base, the dust catcher for the fixed base, the clamp holders of the portable base, the substantially horizontal bottom surface of the guide assembly, and so forth. Therefore, embodiments of the adjustable holding systems further comprise systems having various combinations of the novel features described herein. Therefore, alternative embodiments can include, for example, a fixed base containing only the novel rear clamp assembly and/or dust catcher. Other embodiments can include a fixed base and guide assembly combination having the co-planar surface and infinite vertical adjustability features described herein in combination with a conventional clamp assembly, and so forth.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the invention.

As used herein, the term "fixed base" refers to a base having a dedicated clamp attached thereto, such as a toggle clamp, while the term "portable base" refers to a base intended for use with a handheld clamp, such as a face clamp, i.e., C-clamp. However a "portable base" can also be affixed as a fixture to a work surface in the same manner as a "fixed base." However, unlike a fixed base, a portable base is more easily secured to a work surface which is a part of the structure being constructed, e.g., a preassembled box, thus allowing a user to do remodeling or repair work in tight or awkward spaces.

As used herein, the term "infinite vertical adjustability" i.e., "infinite height adjustability" refers to adjustability of a guide assembly within a fixed base opening or portable base opening which is not limited to specific, predetermined settings. (References herein to a "system" having "infinite vertical adjustability" are intended to have the same general meaning). With infinite vertical adjustability, such as provided in embodiments of the present invention, a user can set a guide assembly at any desired location within an opening and place a contact device, such as a locating pin against a surface, such as a back surface, to temporarily secure the guide assembly in place. The desired location can be determined by interpolating between, above or below markings located on the guide assembly. The user can then drill one or more holes in a workpiece having a thickness corresponding with the interpolated position. A guide assembly having infinite vertical adjustability can also possess incremental vertical adjustability if desired, as in embodiments of the present invention, wherein the contact device is insertable into holes located at predetermined heights in the guide assembly corresponding with specific thicknesses of a workpiece. Also, it is understood that the vertical adjustability of an "infinitely" adjustable guide assembly is limited by the height of the opening, such that the guide assembly needs to be adequately secured within the opening to remain in place during a drilling operation.

In the embodiment shown in FIG. 1, the adjustable holding system 100 is comprised of a fixed base having an L-shape (hereinafter "fixed base") 102, a guide assembly 104, and a rear actuated, i.e., user-side operated, clamp assembly (hereinafter "clamp assembly") comprised of a handle-rod portion 108A and a clamp follower portion 108B, although the invention is not so limited. The clamp assembly can take on any number of configurations as is known in the art. In the embodiment shown in FIG. 1, the handle-rod portion 108A includes a pivotally attached rear (or user side) clamp handle (hereinafter "handle") 132 connected to rods 118A and 118B. The clamp follower portion 108A includes a clamp follower 134 and a clamping pad 136.

The fixed base 102 can be any suitable shape and size. In the embodiment shown in FIG. 1, the fixed base 102 is comprised of a substantially horizontal portion 110 and a contiguous substantially vertical portion 112. For discussion purposes, the substantially horizontal portion 110 is considered herein to be that portion of the fixed base 102 forward of an imaginary vertical line 150 shown in FIG. 1. The substantially vertical portion 112 is that portion of the fixed base 102 rearward of the imaginary line 150, although the invention is not so limited. The substantially vertical portion 112 is configured to form a fixed base opening 111 into which the guide assembly 104 can be inserted. In other embodiments, the substantially horizontal portion 110 and substantially vertical portion 112 are two separate components of any suitable configuration joined together with any known type of connecting means, including a conventional bolt, a T-bolt, and so forth. For example, the substantially horizontal portion 110 may not necessarily include only that portion forward of the imaginary line 150 shown in FIG. 1, but may include the entire length of the fixed base 102 with the substantially vertical portion 112 being a separate component which mounts on top of the substantially horizontal portion 110. In yet other embodiments, there is no substantially vertical portion such that the guide assembly itself is secured to the substantially horizontal portion 110 of a fixed base. Alternatively, a portable base, such as the one described herein, can be secured to a substantially horizontal fixed base (See, for example, FIG. 26).

In this embodiment, the substantially vertical portion 112 is irregularly shaped, with substantially vertical sides that include opposing curved portions 105 (one shown), although the invention is not so limited. Any suitable configuration can be used, as long as the guide assembly 104 can be secured during use within the fixed base opening 111, thus providing a suitable surface against which workpieces can be placed when having holes drilled, such as pocket holes. Each of the curved edges 105 form one side of a triangular gusset portion 109 (shown in dashed lines). The two gusset portions 109 are located on opposing sides of the substantially vertical portion 112 and provide additional support to the substantially vertical portion 112 to avoid any twisting or turning which may occur from operating the clamp assembly 108A and 108B from the back side of the fixed base 102.

The fixed base opening 111 is defined in the back by a back surface 126 (having base exit holes 113A, 113B and 113C), on the sides by two side surfaces 128 and in the front by two partial front surfaces 130. Unlike conventional devices which secure a guide assembly on only two or three sides, the guide assembly 104 described herein is interlocked or "captured on five sides (back surface, side surfaces and two partial front surfaces). In this way an overall more "fluid" adjustment motion is achieved as compared with conventional products which rely on a stepped approach, using ledges to secure the guide assembly into various positions. Additionally, a fixed relationship can now be maintained between a workpiece (not shown) and the guide assembly 104 during clamping The height of the various surfaces is noted below. Regarding the dimensions which define the size of the fixed base opening 111 itself, the two partial front surfaces 130 can be any length with respect to the back surface 126 as long as the guide assembly 104 fits within and no guide holes 122A, 122B and 122C are covered up. In one embodiment, each partial front surface 130 is about five (5) to 20% of the length of the back surface 126, but is not so large as to cover up any of the guide block openings 127A, 127B or 127C. This would otherwise prevent workpieces from being held tightly against the guide block 188 which would produce pocket holes lacking definition and possessing excessive "tear-out" as is known in the art. In one embodiment, the back surface 126 is about three (3) to four (4) ins (about 7.6 to 10.2 cm) in length, each side surface 128 is about 0.5 to two (2) (about 1.27 to 5.1 cm) in length and each partial front surface 130 is about 0.25 to 1.5 ins in length (about 0.64 to 3.8 cm) in length. In a particular embodiment, the back surface 126 is about 3.5 inches (about 8.9 cm) in length, each side surface 128 is about one (1) inch (about 2.54 cm) in length and each partial front surface 130 is about 0.25 inches (about 0.64 cm) in length. A bottom surface 120 preferably has one or more protrusions 121 to prevent waste material from interfering with placement of the guide assembly 104 in a lower position. The front surface of these protrusions 121 support a workpiece (not shown) and are designed to maintain a coplanar relationship between the two partial front surfaces 130 and the front surface of the guide assembly 104 during clamping and drilling. The protrusions 121 can be any suitable size and shape. In the embodiment shown in FIG. 1, the protrusions 121 are rectangular-shaped. In one embodiment, the protrusions 121 are at least as long as the width of the side surfaces 128. In a particular embodiment, there are two to three protrusions about 0.75 to 1.5 ins (about 1.9 to 3.8 cm) in length and about 0.13 to 0.25 ins (about 0.32 to 0.64 cm) in height and width.

The substantially horizontal portion 110 comprises an upper surface 115 proximate to the substantially vertical portion 112 and a rectangular-shaped cutout area 114 to house the clamp follower portion 108B. Two optional curvilinear holders or half-profiles 127 are present on either side of the substantially horizontal portion 110 to serve as pre-drilling guides in conjunction with optional markings 129 located on the upper surface 115 (discussed further in FIG. 7A). Clamp rod openings 116A and 116B are located beneath the upper surface 115.

Optional guide assembly positioning marks 180A, 180B and 180C and fixed base positioning marks 182A, 182B and 182C help the user better align where holes are positioned on a workpiece. The positioning marks are essentially small grooves that can be of any suitable depth, such as up to about 0.05 ins (0.13 cm) or more. These grooves are located along the centerline of guide channels 117A, 117B and 117C discussed below. In one embodiment, a user can make a mark on the workpiece at a location opposite of where a hole is to be drilled. This mark can then be lined up with the appropriate positioning mark. In most instances relating to pocket-hole drilling, however, such precision is not required.

The fixed base 102 can be any suitable size and shape. In one embodiment, the fixed base 102 is about two (2) to four (4) inches (about 5.1 to 10.2 cm) wide and about six (6) to 12 inches (about 15.2 to 30.4 cm) in total length, although the invention is not so limited. The substantially horizontal portion 110 of the fixed base 102 can be any suitable height, such as about 0.5 to one (1) inch (about 1.3 to 2.5 cm), with the substantially vertical portion 102 ranging between about 0.5 and six (6) inches (1.27 and 15.2 cm) in height. In a particular embodiment, the fixed base 102 is about 3.5 ins (about nine (9) cm) in width and about 9.5 inches (about 24 cm) in total length, with the substantially horizontal portion 110 about one (1) inch in height, and the substantially vertical portion 112 ranging from about 2.5 to 4.5 ins (about 6.35 to 11.4 cm) in height.

Figure 15A:
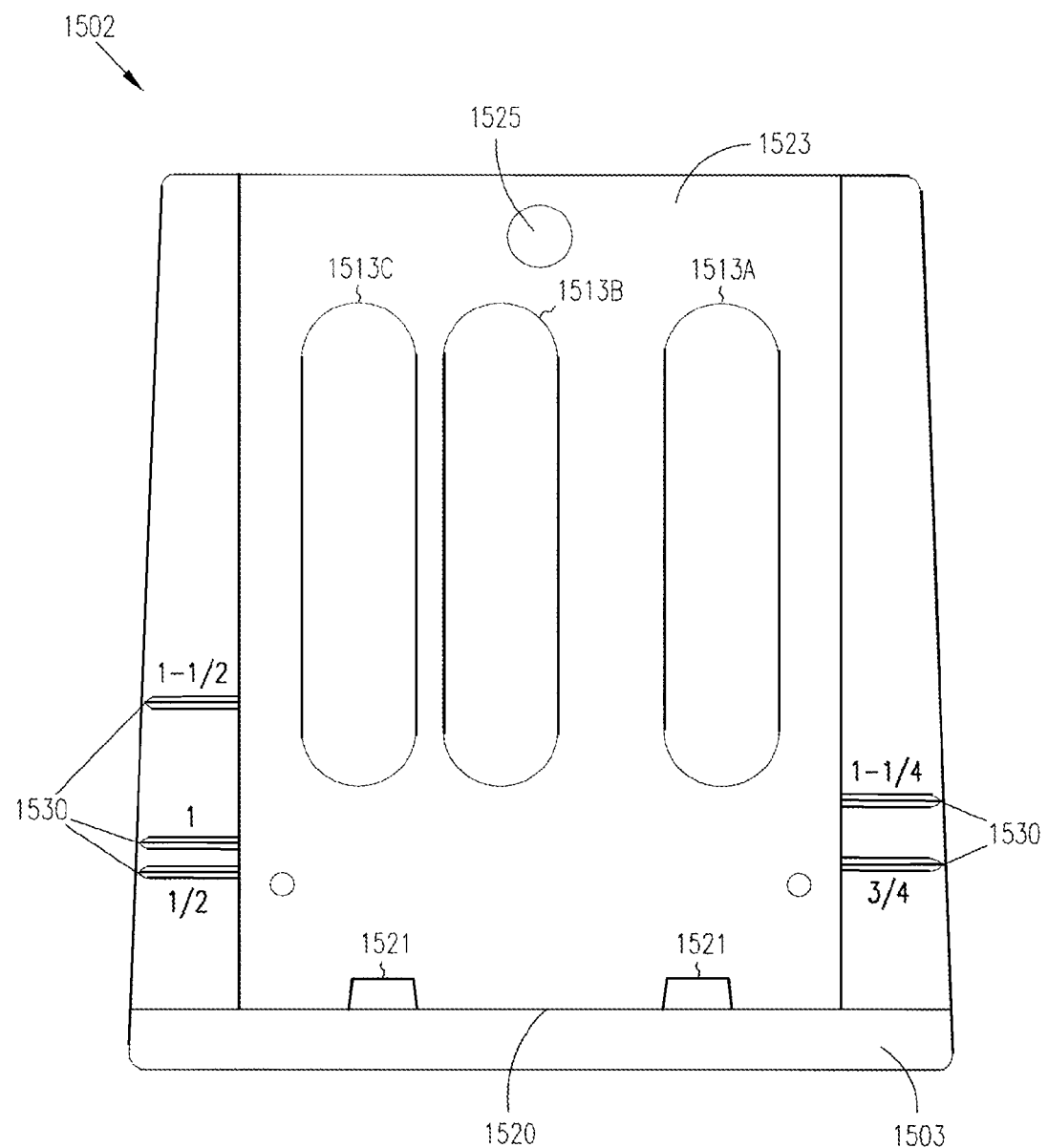
FIG. 15A is a front view of a portable base in one embodiment of the present invention.
Figure 15B:
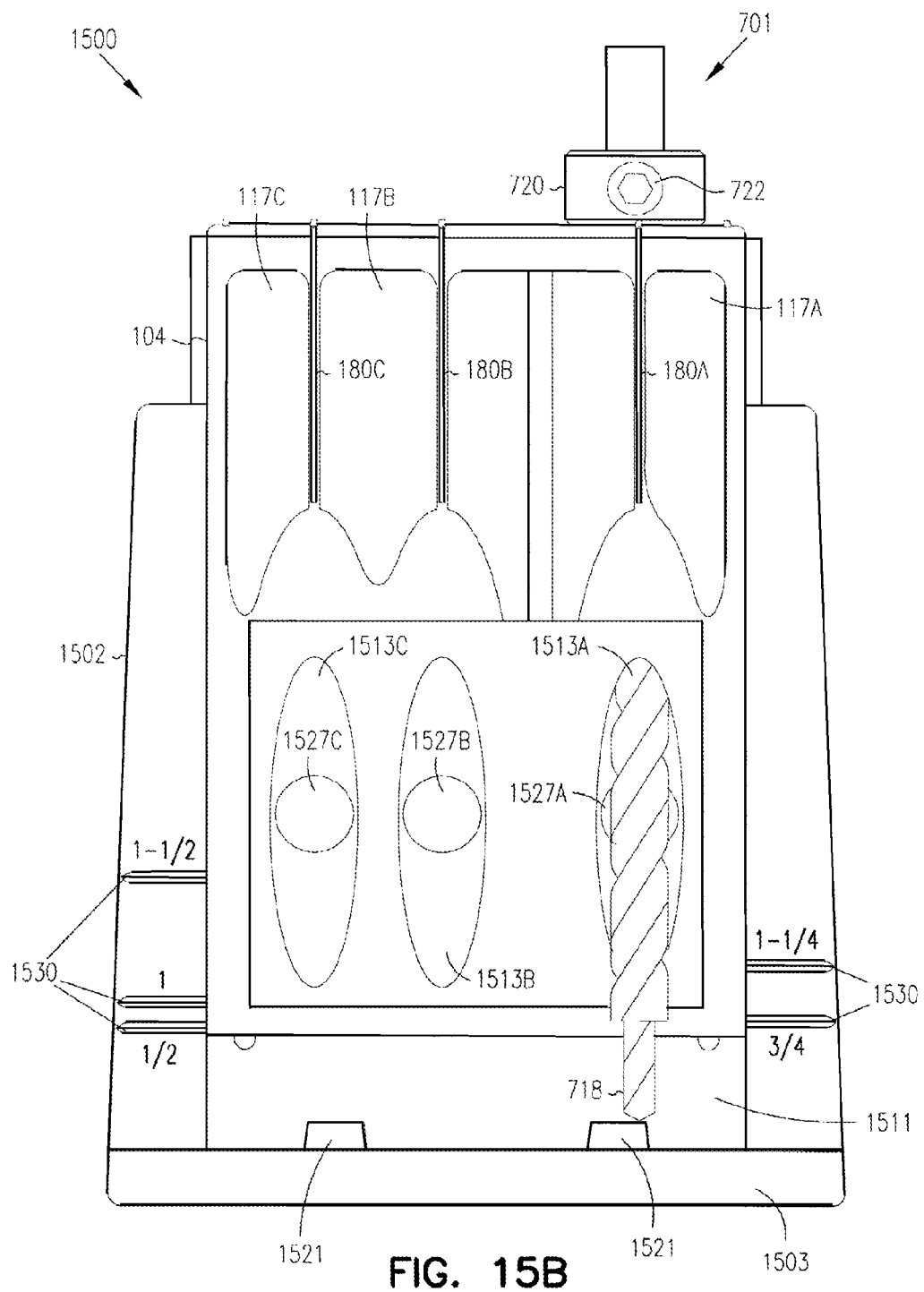
FIG. 15B is a front view of the guide assembly in FIG. 1 and the portable base in FIG. 15A in one embodiment of the present invention.

The unique guide assembly 104 shown in embodiments of the present invention is preferably designed to fit either into the fixed base opening 111 of the fixed base 102 as described above or into a portable base opening 1511 in a portable base, such as the portable base 1502 shown in FIG. 15B. The guide assembly 104 is comprised of a guide block 188 and a guide block holder 190 as shown in FIGS. 1 and 2. The guide assembly 104 is designed to form a co-planar surface with the partial front surfaces 130 which define the front portion of the fixed base opening 111 (and/or with the partial front surfaces which define the front portion of the portable base opening 1511). In one embodiment, this is accomplished by providing the guide block holder 190 with a wider back section 210 and a narrower front section 212. The wider back section 210 is the portion of the guide block holder 190 secured within the fixed base opening 111 (and/or portable base opening 1511). The narrower front section 212 is essentially flush not only with the front faces of the partial front surfaces 130 (and/or the front faces of the partial front surfaces 1530 of the portable base 1502) but also with the front face of the guide block 188 once the guide block 188 and guide block holder 190 have been assembled. The guide block holder 190 preferably has a smooth bottom surface, i.e., a substantially horizontal bottom surface, allowing it to be used alone on a flat surface with a handheld clamp without any type of base or holder, although the invention is not so limited.

The guide assembly 104 is provided with multiple guide channels. In the embodiment shown in FIG. 1, three guide channels 117A, 117B and 117C having varied spacing are used, although the invention is not so limited. In other embodiments, only one or two guide channels may be present and/or the guide channels may be movable (See, for example FIG. 24). However, the use of fixed guide channels, such as the three (3) fixed guide channels 117A, 117B and 117C having varied spacing as shown in FIG. 1 provides for three different two-hole drilling combinations without the use of moving parts as described in U.S. Pat. No. 6,481,937 (hereinafter "'937") and U.S. Pat. No. 6,726,411 (hereinafter "'611"), commonly assigned, both incorporated herein by reference in their entirety. The guide block 188 further has guide block exit holes 122A, 122B and 122C which are aligned with at least a portion of the fixed base exit holes 113A, 113B and 113C, respectively, when the guide assembly 104 positioned properly within the fixed base opening 111. The fixed base exit holes 113A, 113B and 113C serve as "chip breakers" by allowing chips or waste material generated during drilling, to exit. Guide block openings 127A, 127B and 127C in the front portion of the guide block 188 help to further guide a drill bit and also serve as a support to reduce "tear-out", thus producing cleaner holes, as is known in the art. The guide block openings 127A, 127B and 127C further allow a drill bit to exit the front side of the guide assembly 104 and make contact with a workpiece.

Figure 7A:
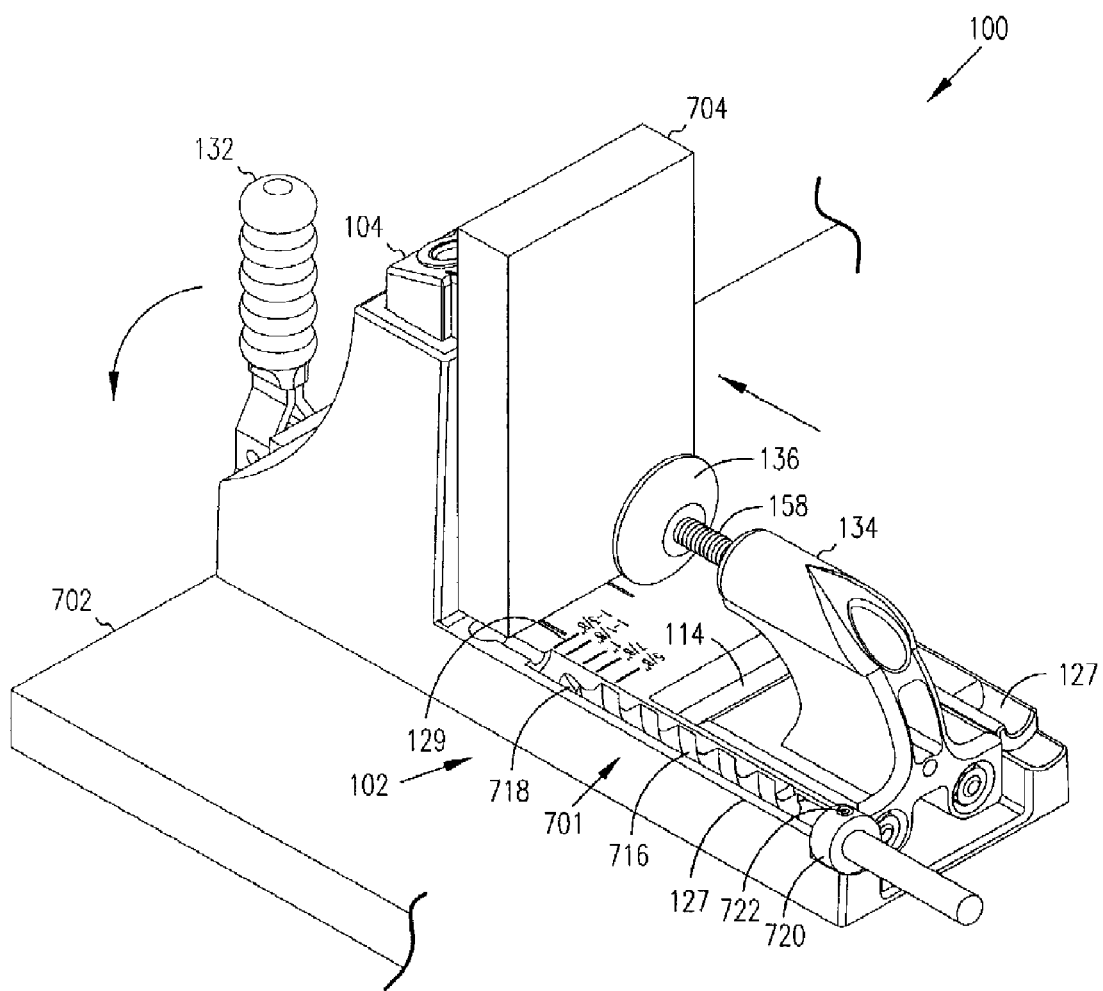
FIG. 7A is a front perspective view of the fixed base in FIG. 1 and an unclamped workpiece, in place on a work surface with the rear actuated clamp assembly in the up position in one embodiment of the present invention.
Figure 7B:
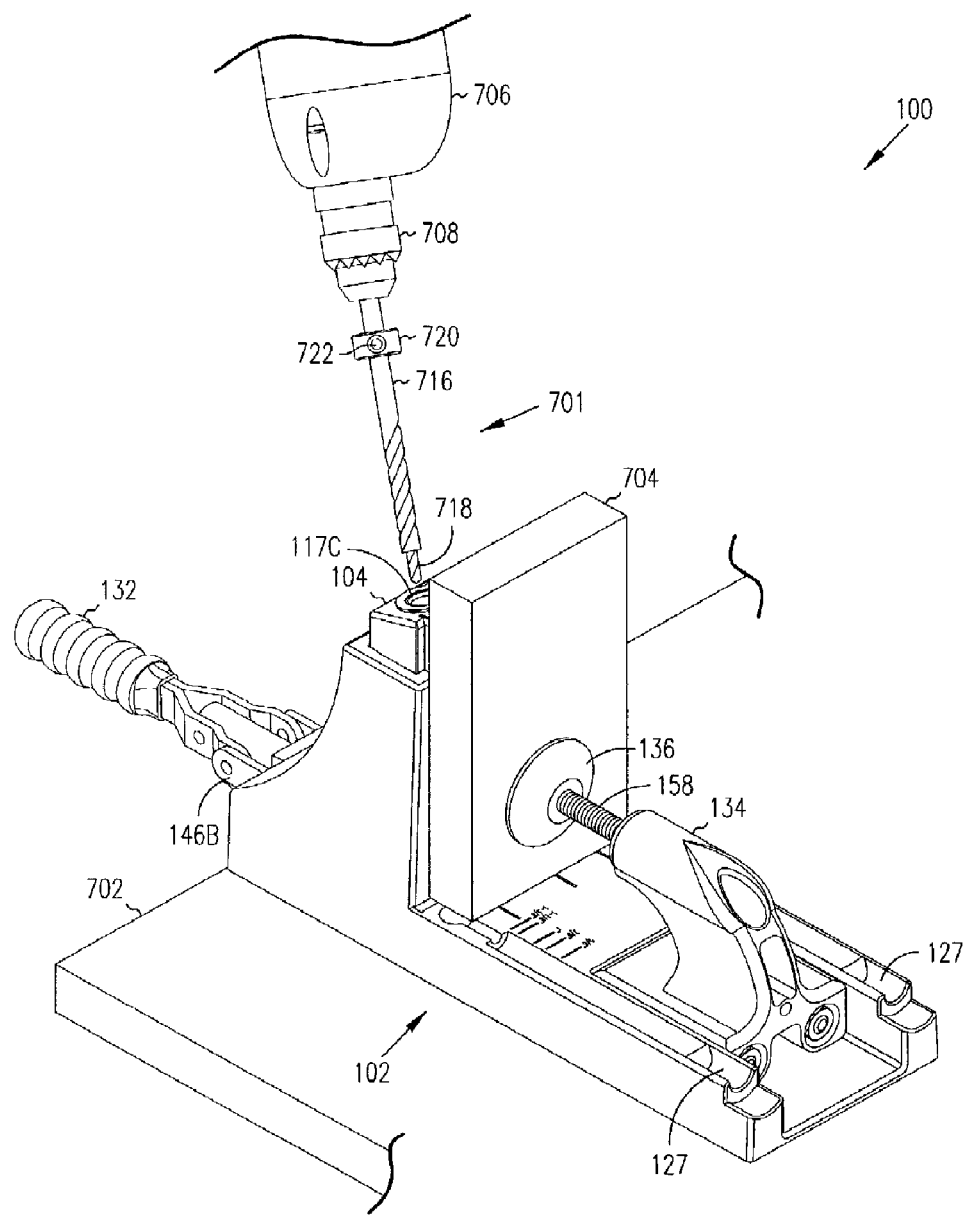
FIG. 7B is a front perspective view of the fixed base in FIG. 1 and a clamped workpiece, in place on a work surface with the rear actuated clamp assembly in the down position in one embodiment of the present invention.

The axial bore of each guide channel 117A, 117B and 117C is disposed to receive and guide the shank of a drill bit as shown in FIG. 7B, for example. (See also U.S. Pat. No. 4,955,766, commonly assigned). The guide channels 117A, 117B and 117C are angularly disposed with respect to the vertical planar surface. Although the precise angle can vary, an angle of about 15 degrees is commonly used to form pocket joints in wooden or composite (i.e., material dense fiberboard (MDF), particle board, etc.) workpieces, although the invention is not so limited. The angle can also be greater or less than 15 degrees. In a particular embodiment the angle is about 14 degrees.

The upper end of each guide channel 117A, 117B and 117C forms a stop flange 123A, 123B and 123C, respectively. The lower end of each guide channel 117A, 117B and 117C is contained within the guide block 188, just above guide block exit holes 122A, 122B and 122C and guide block openings 127A, 127B and 127C.

Figure 2:
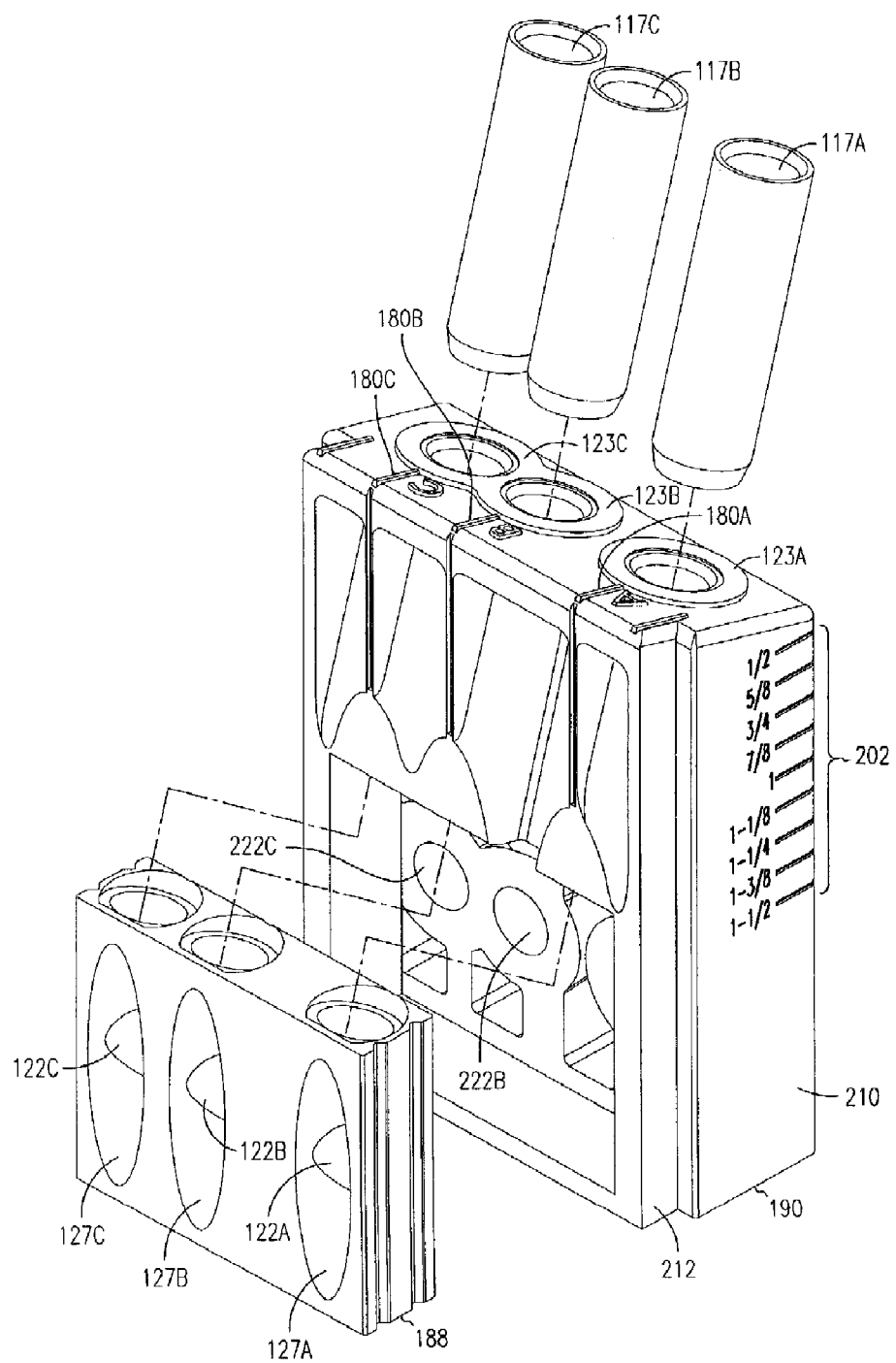
FIG. 2 is an exploded view of a guide assembly in FIG. 1 in one embodiment of the present invention.

Again, in the embodiment shown in FIG. 1, the guide assembly 104 has a substantially vertical planar surface and an angled top portion, although the invention is not so limited. The back section 210 of the guide assembly 104, i.e., the portion which slides down into the fixed base opening 111 (and/or the portable base opening 1511), is necessarily sized to be slightly smaller than the opening so that it can be moved up and down within the opening (111 or 1511) yet not slip out of position when a contact device, such as a locating pin 124 as shown in FIG. 1, is pressed against it. In one embodiment, the difference in overall length and width between the back section 210 of the guide assembly 104 and the fixed base opening 111 (and/or portable base opening 1511) is less than about 0.1 to 0.15 mm, respectively. In a particular embodiment, the front substantially vertical planar surface of the back section 210 of the guide assembly 104 is about four (4) to six (6) inches (ten (10) to 15 cm) in height, and only slightly narrower than the width than the fixed base opening 111 (and/or portable base opening 1511), i.e., about 0.1 to 0.15 mm. The front section 212 of the guide assembly 104 is generally narrower than the back section 210 by a dimension sufficient to provide a co-planar surface with other components as discussed herein. In one embodiment, the front section 212 is about one (1) to ten (10)% narrower on each side than the back section 210. In a particular embodiment, the front section 212 is about 0.2 to 0.5 ins (about 0.5 to 1.3 cm) narrower on each side than the back section 210. The guide assembly 104 can have any suitable thickness, and can be irregular in shape as long as it has sufficient height and thickness to provide adequate support for the guide channels 117A, 117B and 117C and can further fit securely into the fixed base opening 111 as described below.

As will be discussed herein, the guide assembly 104 can be placed at essentially any vertical position within the fixed base opening 111 of the fixed base 102 (and/or the center opening 1511 of the portable base 1502 shown in FIG. 15B), thus providing infinite vertical adjustment capabilities for a given fixed base or portable base. This provides additional flexibility over devices providing only incremental adjustments of specific distances. As noted above, the guide assembly 104 is held in place with the locating pin 124 which can contact the back surface of the guide assembly 104 at any location, as long as the guide assembly 104 can remain secure within the fixed base opening 111 (or 1511) during drilling. In one embodiment, the locating pin 124 is threaded and insertable into a threaded insert 198 as shown in FIG. 1, which itself is press fit into a channel 199 contiguous with the back surface of the substantially vertical portion 112 (or contiguous with the back surface of the portable base 1502), although the invention is not so limited. Any object that can be inserted and retracted from the base 102 into the guide assembly 104 to keep the guide assembly 104 from moving up or down during drilling can be used. However, an object relying only on a friction fit would not provide both the easy adjustment and adequate holding strength necessary.

Figure 3:
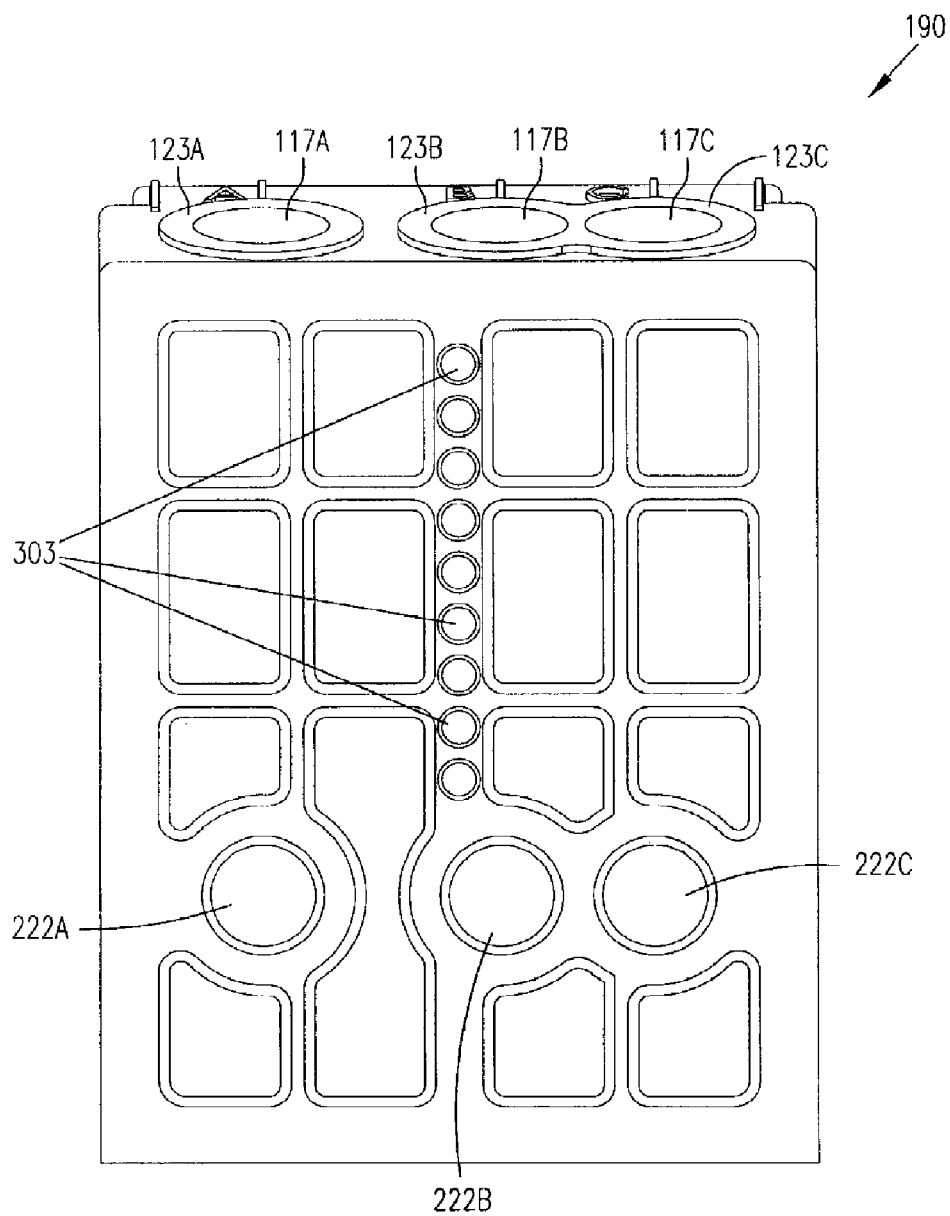
FIG. 3 is a back view of the guide assembly in FIG. 2 in one embodiment of the present invention.

If desired, a pre-existing opening 303 in the guide assembly 104 as shown in FIG. 3 can be aligned with the channel 199 and the locating pin 124 inserted through the channel 199 and into the pre-existing opening 303. These pre-existing openings 303 correspond with common material thicknesses. The thickness markings 202 (which are determined according to methods known in the art) correspond with each pre-existing opening 303 and can be seen in FIG. 2. In this way, proper placement of pocket holes in workpieces of various thicknesses can easily be achieved. This includes workpieces greater than about 1⅛ inches (29 mm) as well as thinner workpieces less than about ¾ inches (19 mm) down to about ½ inch (13 mm). As a result, a pocket hole can be drilled further from the edge of the workpiece, allowing a screw to exit essentially in the center of the workpiece, as desired. As such, the various embodiments of the present invention provide virtually unlimited vertical adjustability without the need for separate components.

As noted above, the guide assembly 104 is comprised of a guide block 188 and guide block holder 190 containing the guide channels 117A, 117B and 117C as shown in FIG. 2. In the embodiments shown in most figures herein, there are three guide channels, although the invention is not so limited. Any suitable number and configuration of guide channels can be used. Guide block exit holes 122A, 122B and 122C noted above in FIG. 1 are technically part of the guide block 188 only with corresponding guide block holder exit holes 222A, 222B and 222C, which are substantially aligned therewith after assembly. The guide block holder exit holes 222A, 222B and 222C, in turn, are substantially aligned with the fixed base exit holes 113A, 113B and 113C when the guide assembly 104 is inserted into the fixed base 102 (or with the portable base exit holes 1513A, 1513B, 1513C shown in FIG. 15A). The guide channels 117A, 117B and 117C, guide block holder 190 and guide block 188 are preferably assembled during manufacturing as described below. In one embodiment, the guide assembly 104 further contains the thickness markings 202 as noted above, with larger numbers corresponding with thicker materials located higher than the smaller numbers, which correspond with thinner materials. In this way, the guide assembly 104 is placed higher within the fixed base opening 111 (or the portable base opening 1511) for thicker materials and lower for thinner materials.

In this embodiment, the thickness markings 202 are for ½ inch (1.2 cm), ⅝-inch (1.6 cm), ¾-inch (1.9 cm), ⅞-inch (2.2 cm), one (1) inch (2.54 cm), 1⅛ inch (2.9 cm), 1¼ inch (3.2 cm), 1⅜ inch (3.5 cm) and 1½ ins (3.8 cm), although the invention is not so limited. Any desired sizes can be marked as shown, including in English and metric or metric alone, although the thicknesses marked are considered relatively common thicknesses. The user aligns the appropriate thickness marking 202 with the top of the fixed base opening 111 or portable base opening (1511) and uses the locating pin 124 to secure the guide assembly 104 in the desired location as discussed above. (See, for example FIG. 16).

FIG. 3 provides a rear view of the guide block holder 190 showing guide pin openings 303 which correspond with, and are substantially at the same height as, the markings 202 shown in FIG. 2.

Again, the clamp assembly can take on any number of configurations. In the embodiment shown in FIG. 1, the clamp assembly is comprised of the handle-rod portion 108A and the clamp follower portion 108B as noted above. The handle 132 interacts with the clamp follower 134 via rods 118A and 118B having threaded ends 137A and 137B, respectively, although the invention is not so limited. Any suitable number and type of rods or rod assemblies can be used. In an alternative embodiment, only one rod is used. In yet other embodiments, more than two rods are used. The rods can take on any configuration such as square, circular, rectangular, and the like. In one embodiment, the rods 118A and 118B are tie-rods. In yet other embodiments, rods 118A and 118B are replaced with other types of connectors, such as linkage arms or cables. In one embodiment, the clamp assembly 108A and 108B is a pneumatic clamp assembly, such as is described in U.S. patent application Ser. No. 60/603,976, filed Aug. 24, 2004, commonly assigned, and incorporated herein by reference in its entirety.

In the embodiment shown in FIG. 1, each rod 118A and 118B is comprised of a first section 138A and 138B and a second section 136A and 136B, respectively.

Figure 4:
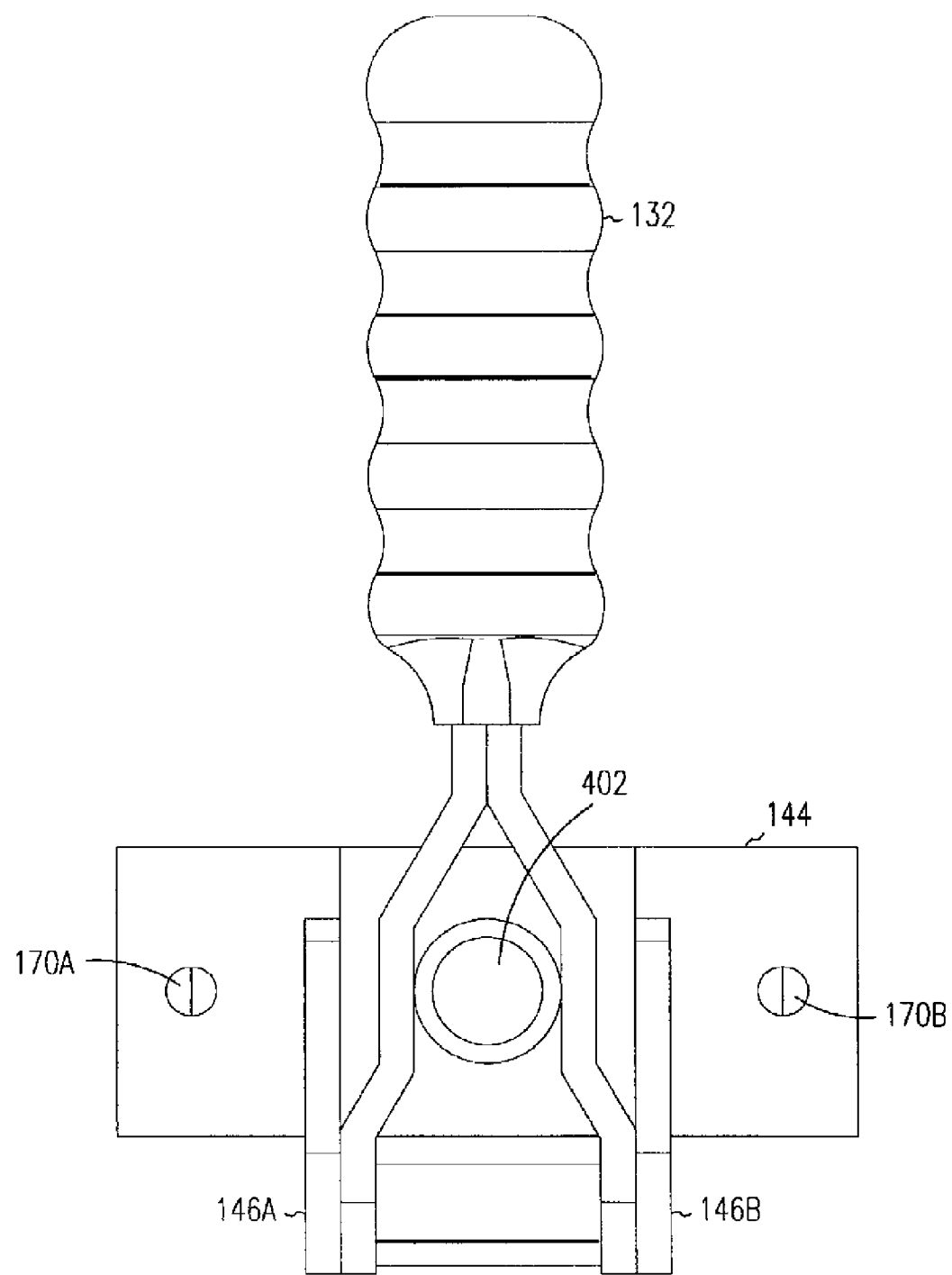
FIG. 4 is an end view of a handle portion of a rear actuated clamp assembly in FIG. 1 in an up or "unclamped" position in one embodiment of the present invention.

The second sections 136A and 136B end in the threaded portions 137A and 137B, respectively, and are slightly narrower in diameter than the first sections 138A and 138B. The second sections 136A and 136B are designed to be about the same length as the clamp follower 134. In one embodiment, each second section 136A and 136B is about 25 to 50% the size of the overall size of its respective rod 118A and 118B. Each rod 118A and 118B moves axially in either direction as the handle 132 is rotated in an upwardly or downwardly direction. Clamp springs, 162A and 162B, located around the first sections, 138A and 138B, provide tension on the clamp follower 134. The handle 132 is connected to a main rod housing 144 via pivoting levers 146A and 146B (See FIG. 4). The main rod housing 144 is secured to the fixed base 102 via clamp connecting means 170A and 170B, such as threaded bolts shown in FIGS. 1 and 4. A main rod 150 is secured by any suitable means to the main rod housing 144, such as with a securing pin 402 shown in FIG. 4. The main rod 150 passes through the main rod housing 144 and connects with a rod assembly tie-bar 152 which, in this embodiment, connects to one end of each of the two rods 118A and 118B (See FIG. 1).

The clamping pad 136 is secured to the clamp follower 134 by any suitable means. In the embodiment shown in FIG. 1, the clamping pad 136 is rotatable on a threaded bolt 158 which screws into a threaded opening (not shown) in the clamp follower 134. In the embodiment shown in FIG. 1, a threaded insert 160 is used, although the invention is not so limited. The clamp follower 134 is designed to fit snugly, but with sufficient allowance to be able to slide back and forth within the rectangular shaped opening 114 during use. In one embodiment, the clearance is about 0.25 to 0.35 mm. In one embodiment, the clamp follower 134 is designed to hold one or more tools, such as a hexagonal wrench, which can then be used to secure the springs 162A and 162B to the rods 118A and 118B.

Figure 5:
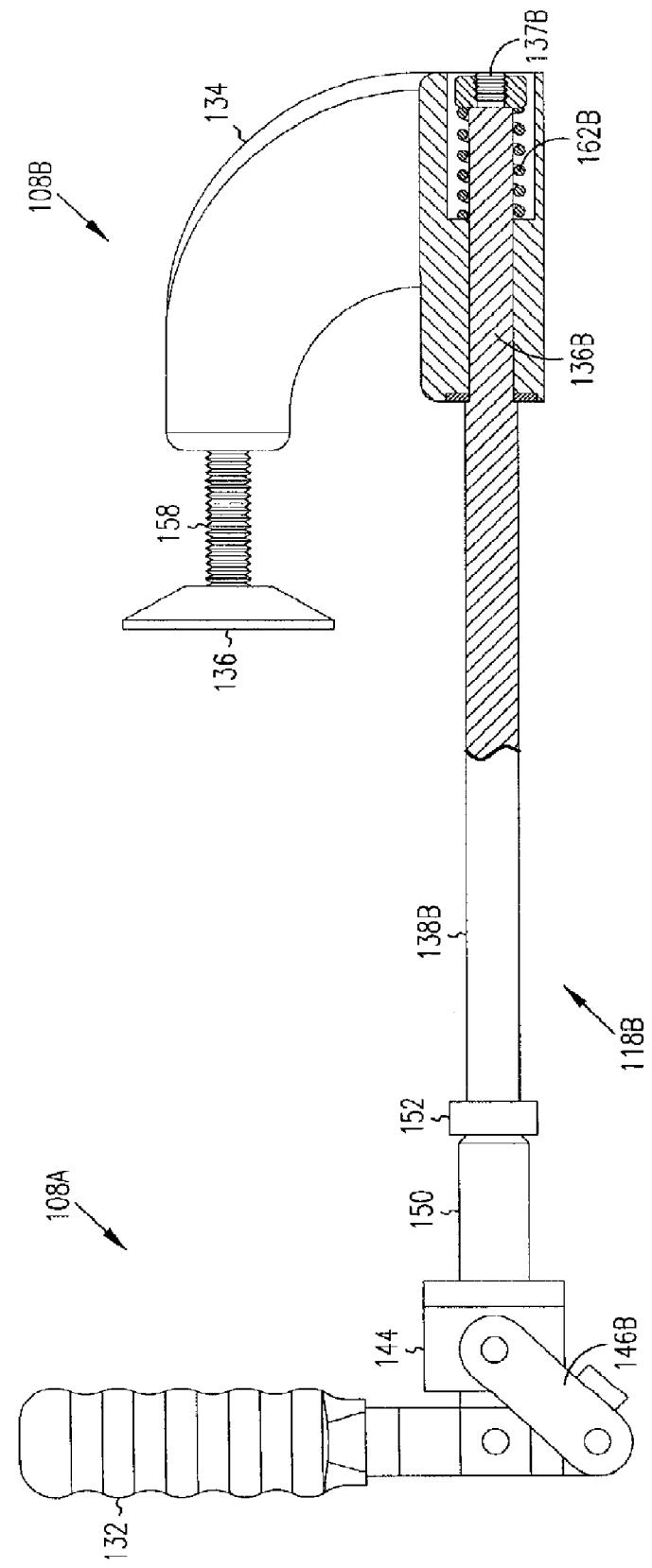
FIG. 5 is a combined cross-sectional and side view of the rear actuated clamp assembly in FIG. 1 in one embodiment of the present invention.

FIG. 5 is a combined cross-section and side view of the handle-rod portion 108A and clamp follower portion 108B of the clamp assembly of FIG. 1 in one embodiment of the present invention. The springs (only 162B shown) in the clamp follower portion 108B provide some "give" to accommodate various sizes of work pieces. In this way, small variations in wood thickness can be accommodated without the need to adjust the position of the clamping pad 136. However, fine adjustments can be made to the position of the clamping pad 136, as needed, by moving it in either direction along the threaded rod 158. For example, prior to drilling, but after lowering the handle 132 to the down or clamped position, the clamping pad 136 can be rotated along the threaded rod 158 towards the workpiece until sufficient contact is made for the workpiece to be fully clamped, if this did not otherwise occur when the handle 132 was moved to the "down" position.

Any type and size of conventional compression spring can be used as long as it can perform the intended function. In one embodiment, each spring 162A and 162B is between about one (1) and 1.5 ins (about 2.54 and 3.8 cm) in length, about 0.38 to 0.62 (about 0.95 to 1.6 cm) in diameter, and has a spring constant of between about 100 and 200 lbf (about 45.4 and 91 kgf) or greater, depending on the particular application. In a particular embodiment, Model No. LC-080-G-5 springs from Lee Spring Co. having offices in Brooklyn, N.Y., which are about one (1) inch (about 2.54 cm) in length, about 0.48 in (about 1.22 cm) in diameter, and have a spring constant of about 172.4 lbf (about 78.2 kgf) are used, although the invention is not so limited.

Figure 6A:
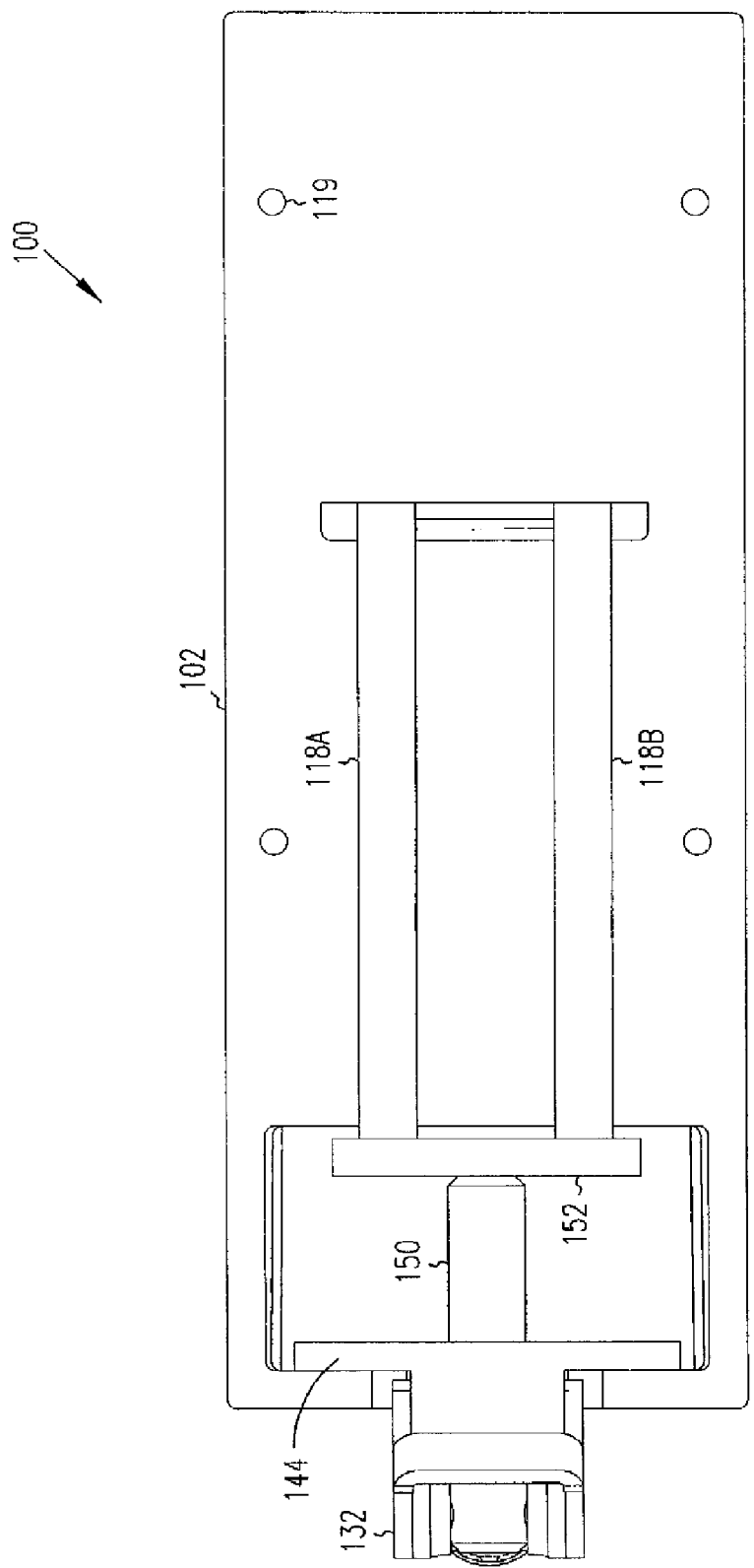
FIG. 6A is a bottom view of the fixed base in FIG. 1 with the rear actuated clamp assembly in the up position in one embodiment of the present invention.
Figure 6B:
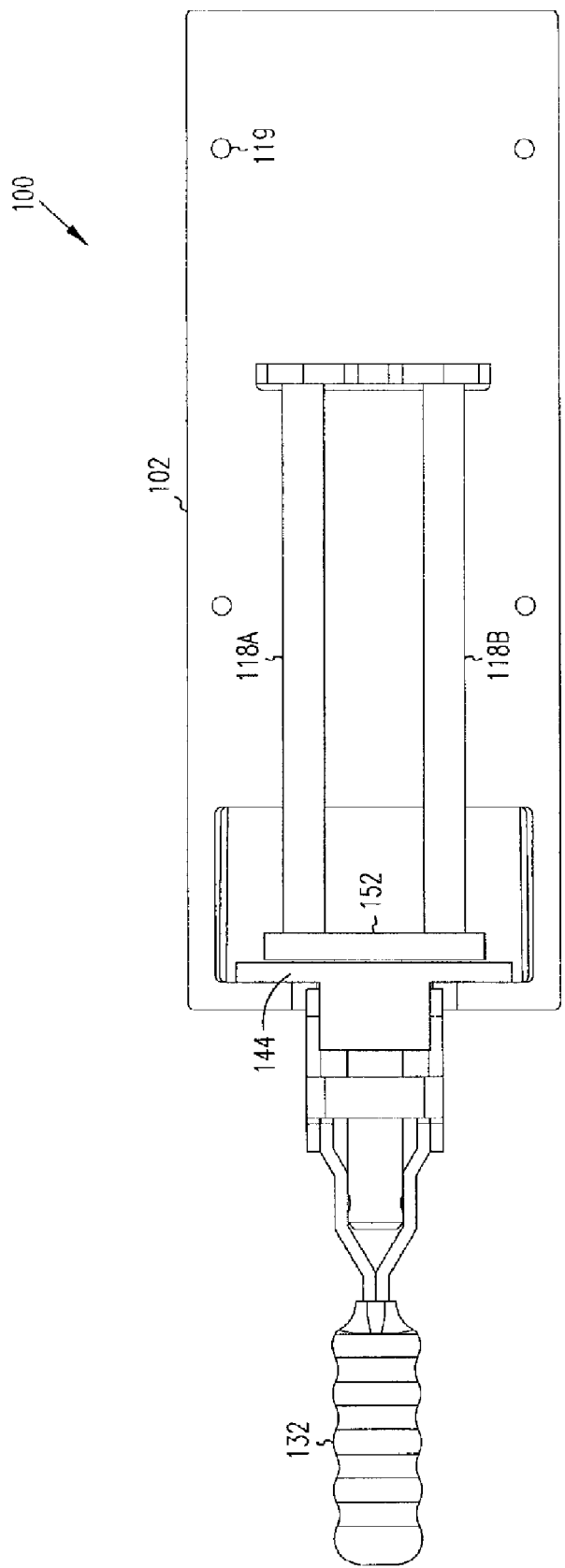
FIG. 6B is a bottom view of the fixed base in FIG. 1 with the rear actuated clamp assembly in a down or "clamped" position in one embodiment of the present invention.

As noted above, the handle 132 can either be in the "up," i.e., unclamped position or the "down," i.e., clamped position. FIGS. 6A and 6B provide bottom views of the fixed base 102 with the handle 132 installed in the fixed base 102. The handles 132 are shown in the "up" or clamped position in FIG. 6A and in the "down" or unclamped position in FIG. 6B. In this embodiment the rods 118A and 118B are visible from the bottom, although the invention is not so limited. In other embodiments, the rods 118A and 118B are fully encapsulated within the rod openings 116A and 116B shown in FIG. 1.

The adjustable holding system 100 is securable to a planar surface, such as a substantially horizontal work surface. The adjustable holding system 100 can be secured to such a surface by any suitable means. In the embodiment shown in FIG. 1, the substantially horizontal portion 110 has recessed openings 119 through which screws can be inserted for attachment of the fixed base 102 to a workbench or other planar surface, although the invention is not so limited. In one embodiment, the guide assembly 104 is used alone with a separate clamp or in a portable base (1504) as described in FIGS. 15A, 15B and 16-20.

FIGS. 7A, 7B, 8, 9 and 10 show a supported adjustable holding system 100 on a work surface or table 702. In one embodiment, the fixed base 102 is secured to the work surface 702 and is used as a fixed device or fixture. As noted above, the portable base 1502 can also be affixed to a work surface (See, for example, FIG. 21) and is further useful in various repair or remodeling applications. In the embodiments shown in FIG. 7B and FIG. 9, a guide channel is about to be used as a guide for drilling a pocket hole in a workpiece 704 using a conventional drill bit 701 secured to a conventional drill 706 having a chuck 708, whereas in FIG. 8, the drill bit has been fully inserted into a guide channel 117B.

In FIG. 7A, a workpiece 704 has been set onto the fixed base 102 but is not yet clamped in place, as the handle 132 is in the up or unclamped position, such that the clamp follower 134 and clamping pad 136 are not in contact with the workpiece 704. The workpiece 704 can be any type of conventional workpiece, such as a railing, although the invention is not so limited. As noted above, workpieces of various sizes can be used with the system 100 described herein.

In one embodiment, the workpiece 704 is larger than a "2.times.4" (5.1.times.10.2 cm), up to about a "2.times.12" (5.1.times.30.5 cm).

Once the handle 132 is pulled down, i.e., rotated in a downwardly direction, as indicated by the arrow, the clamp follower 134 (and therefore the clamping pad 136) move forward until contact is made with the workpiece 704 as shown in FIG. 7B. Again, the springs 162A and 162B (not shown) in the clamp follower portion 108B of the clamp assembly allow some give to adjust for minor differences in thickness of materials with major adjustments made by screwing or unscrewing the clamping pad 136. For example, the workpiece 904 shown in FIG. 9 is thicker than the workpieces shown in FIGS. 7A, 7B or FIG. 8, yet the system 100 functions in essentially the same manner to securely clamp the workpiece 902 in place. However, in this embodiment, the clamping pad 136 remains a little closer to the main body of the clamp follower 134 as compared with the thinner workpieces of FIGS. 7B and 8.

FIG. 7A shows a drill bit 701 laying in one of the two optional curvilinear holders or half-profiles 127 present on either side of the substantially horizontal portion 110. Any suitable type of drill bit can be used. In the embodiment shown herein, the stepped drill bit 701 includes a pocket-forming portion 716 and a smaller-diameter guide hole-forming portion 718. An adjustable depth collar 720 can be selectively secured to the pocket forming portion 716 through use of a set screw 722.

As noted above, these half-profiles 127 serve as pre-drilling guides in conjunction with the optional markings 129. As can be seen, the half-profiles conform to the length-wise half shape of a stepped drill bit 701. In this way, the stepped drill bit 701 can be positioned into the half-profile 127 and supported, while adjustments are made to the location of the depth collar 720. In one embodiment, such adjustments correspond to the thickness of the workpiece being drilled.

Specifically, by aligning the end of the pocket forming portion 716 with the desired location marked on the upper surface 115 of the fixed base 102, the depth collar 720 can be positioned (through use of the set screw 722) to abut the outside edge of the fixed base 102. The markings of "½", "¾" and "1½" on one side of the upper surface 115 (not shown) and "⅝", "⅞", "1", "1⅛", "1¼" and "1⅜" on the opposing side of the upper surface 115 correspond with typical material thicknesses used in the construction and craft trades. In the embodiment shown in FIG. 7A, the end of the pocket forming portion 716 is at about the "⅞" mark which corresponds with a workpiece about 0.88 ins (about 2.2 cm) thick.

Alternatively, such markings could additionally or alternatively be given in metric units, i.e., 1.2 cm, 1.9 cm, 3.8 cm and 1.6 cm, 2.2 cm, 2.54 cm, 2.9 cm, 3.2 cm and 3.5 cm. In this way, the drill bit 701 can be preset to drill the proper distance into a specific thickness of workpiece. Use of these markings and guides provides a simple and fast method for setting up or changing depth collar settings, although the invention is not so limited. In an alternative embodiment markings 1530 (shown in FIGS. 15A and 15B) can additionally or alternatively be present on the front surface of the substantially vertical portion 112 of the fixed base 102 for use as a stop collar guide as described in FIG. 15B, once the guide assembly 104 has been set to the proper marking 202 shown in FIG. 2. In another embodiment, support wings, such as those described in '937, supra, can be used for this purpose.

In one embodiment, the markings 129 carry both an English indicia scale and a metric indicia scale. Thus, the fixed base 102 can also be used as a stand-alone gauge for set depth collar settings when using the portable base (1502) shown in FIG. 15A or any other device. In an alternative embodiment, additional markings are present near the end of the fixed base 102, such as on the vertical portion. Such markings can be used as a guide for setting shallower depths for the depth collar. This can be useful when counterboring screw holes, for example.

FIG. 7B shows a workpiece 704 fully clamped and ready to be drilled. The handle 132 is in the "down" or clamped position and the clamping pad 136 is in contact with the workpiece 704. The workpiece 704 is also in contact with both the guide assembly 104 and the front surface of the substantially horizontal portion 110 of the L-shaped base 102. A stepped drill bit 701 is about to be inserted into one of the guide channels 117B, although the invention is not so limited. Again, any suitable type of drill bit can be used, depending on the application.

Figure 8:
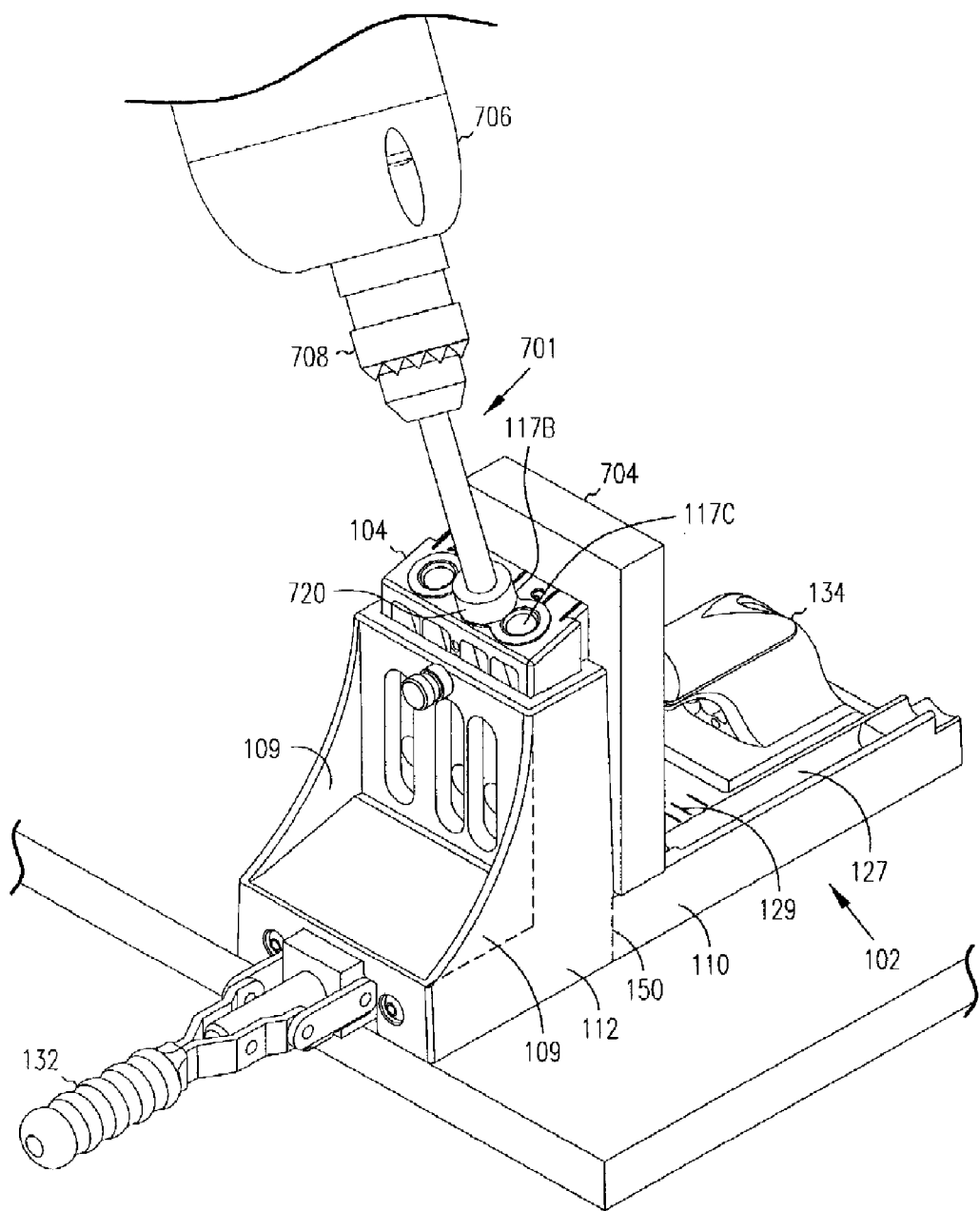
FIG. 8 is a back perspective view of the fixed base in FIG. 7B in one embodiment of the present invention.
Figure 9:
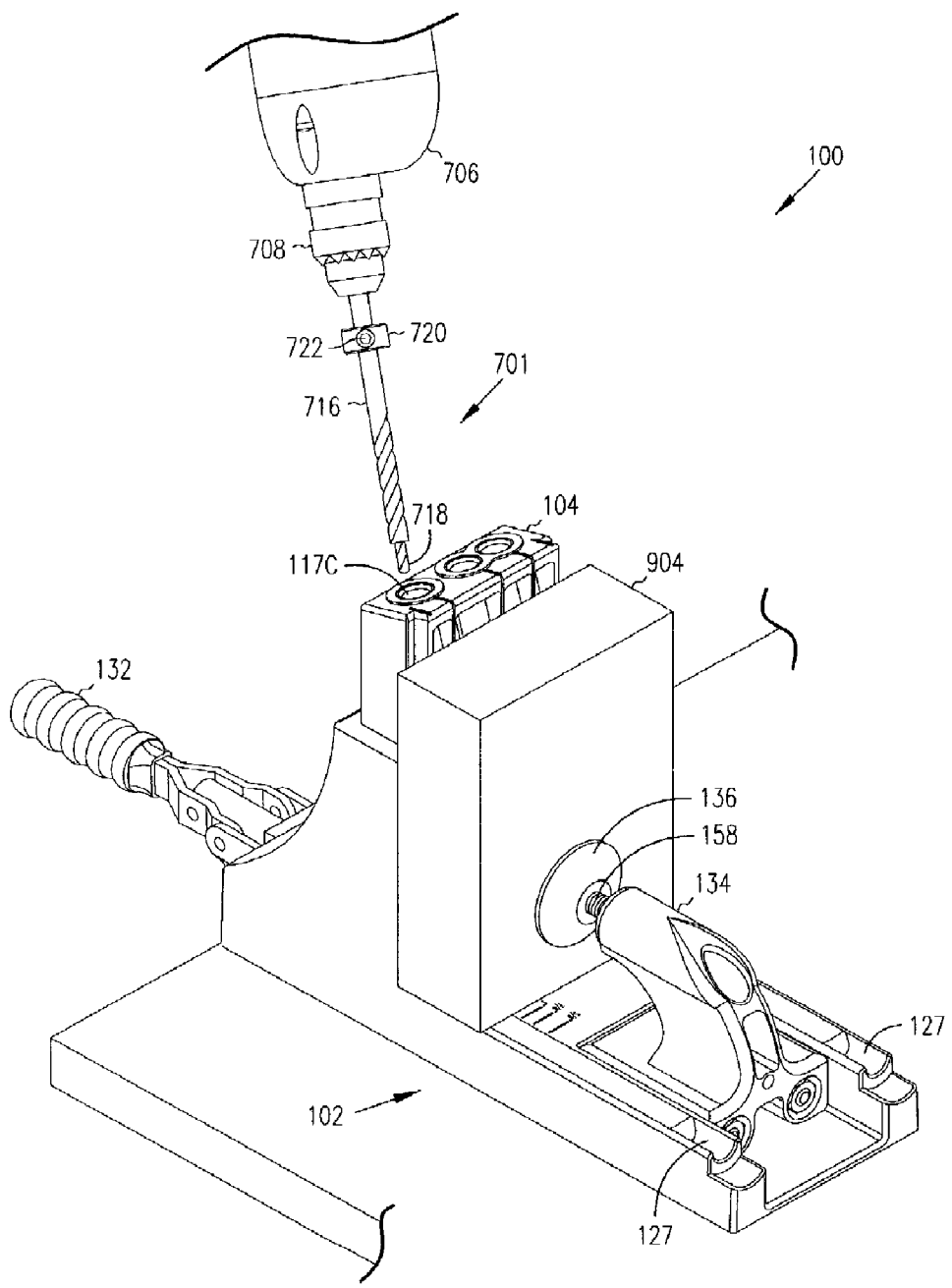
FIG. 9 is a front perspective view of the fixed base in FIG. 7B and a thicker clamped workpiece in one embodiment of the present invention.

FIG. 8 shows a stepped drill bit 760 inserted into a guide hole channel 117B. As FIG. 8 shows, when fully inserted, i.e., at maximum drilling depth, the depth collar 720 is in contact with the stop flange, e.g., 123B, as is known in the art. Use of the depth collar 720 also prevents damage to the adjustable holding system 100, since the end of the stepped drill bit 701 is prevented from extending through to the other side of the workpiece. One of the gusset portions 109 described above in FIG. 1 is also clearly visible in FIG. 8. In other embodiments, the gusset portion 109 is configured to secure a dust catcher in place (see FIG. 12A).

The resulting holes are drilled at the appropriate width and depth in the workpiece, resulting in precisely-aligned pocket holes in a wide range of materials. In an alternative embodiment, only one hole is drilled in a workpiece using the adjustable holding system 100. In another alternative embodiment, more than three (3) guide channels are present, and multiple hole-drilling combinations can be achieved. In yet another embodiment, more than two holes are drilled for one joint in a workpiece, such that all three guide channels are used. In yet another embodiment, an interchangeable set of guide assemblies 104 with varying sizes and numbers of guide channels is provided for use with the same fixed base 102.

In operation, the depth collar 720 can be properly positioned for a workpiece 704 of a particular thickness by placing the pocket forming portion 716 of the drill bit 701 adjacent to the appropriate marking in the drill guide 127 contained on the fixed base 102. The drill bit 701 can then be secured in the chuck 706 of a handheld drill 708, although the invention is not so limited. Alternatively, the depth collar 720 can be preset to the desired position in any suitable manner before or after the drill bit 701 is secured to the drill 708. The workpiece 704 is then secured flush to the planar surface of the guide 104 with the clamp assembly by moving the clamp handle 132 in a downwardly position, thus causing the rods 186A and 186B to move forward through the rod openings 116A and 116B, respectively, and the clamp follower 134 to move forward along the rods 186A and 186B, respectively, in the opposite direction, i.e., towards the handle 132. Once the handle 132 is fully down, the forward motion of the clamp follower 134 stops. If sufficient contact between the clamping pad 136 and workpiece 704 is not achieved, the clamping pad 136 can be adjusted by rotating it forward towards the workpiece 704 until the workpiece 704 is fully clamped.

The user then activates the drill 708, inserting the drill bit 701 into the desired guide channel, e.g., 117B, through the opening in the guide assembly 104 and into the workpiece 704. The drilling continues until the depth collar 720 engages the stop flange, e.g., 123B. The resulting pocket and guide holes are burr-free, and essentially "near-perfect" with respect to position, size and shape. Another advantage of the adjustable holding system 100 is that, in one embodiment, a second hole can then be easily drilled without making any adjustments to either the workpiece or to the adjustable holding system. In an alternative embodiment, a second hole is drilled after removing the guide assembly 104 from the fixed base 102 and securing it in place in a portable base 1502 (shown in FIG. 15A). In one embodiment, a first hole, a third hole or any hole can be drilled in this manner. In yet another alternative embodiment, a second hole is drilled after removing the guide assembly 104 from the fixed base 102 and securing it on a work surface using screws inserted into recessed holes in the bottom of the guide assembly 104. In one embodiment, a first hole, a third hole, or any hole can be drilled in this manner.

Figure 10:
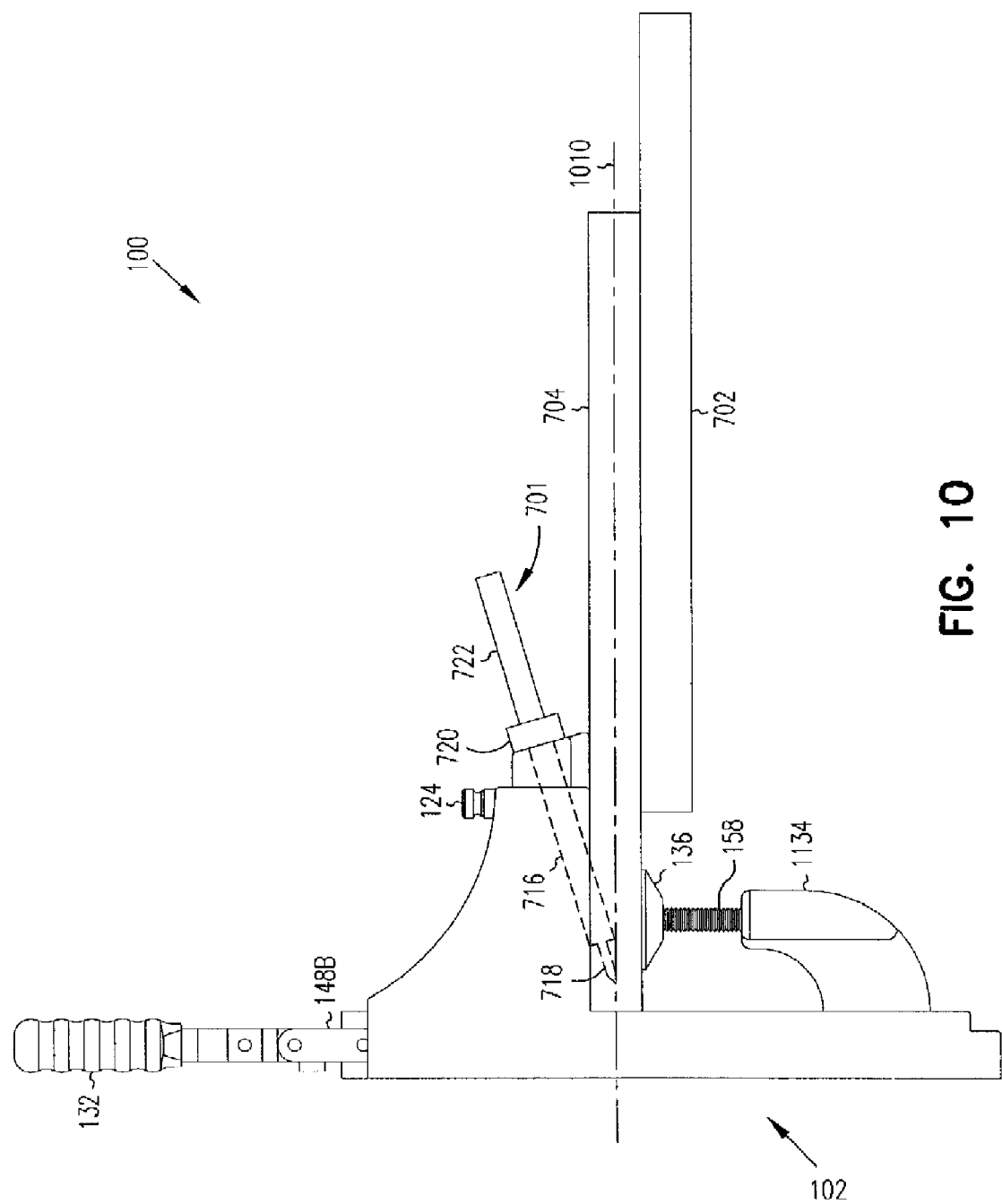
FIG. 10 is a side view of the fixed base in FIG. 7B in a vertical position with respect to the work surface and a clamped workpiece in one embodiment of the present invention.

FIG. 10 shows an adjustable holding system 100 placed on a workpiece 704 which has been laid flat on a work surface 702. In this embodiment, the front of the guide assembly 104 is resting on the top surface of the workpiece 704 and the clamping pad 136 is in contact with the bottom surface, such that the workpiece 704 is secured in place from the bottom side. In an alternative embodiment, the workpiece 1204 does not necessarily extend beyond the edge of the work surface 702 and the clamping pad 136 is secured to the bottom of the work surface 702. Use of the adjustable holding system 100 in this type of manner may be useful when drilling holes in large sheets of material, such as plywood sheeting, e.g., up to six (6) feet by eight (8) feet (1.8 by 2.4 m), or more. The drill bit 701 in this embodiment is again shown fully inserted into a guide hole channel As FIG. 10 shows, when fully inserted, i.e., at maximum drilling depth, the depth collar 720 is in contact with the stop flange, e.g., 123A, as is known in the art. Use of the depth collar 720 also prevents damage to the adjustable holding system 100, since the end of the stepped drill bit 701 is prevented from extending through to the other side of the workpiece.

The drill bit 701 shown in FIG. 10 has drilled a pocket hole using one of the guide channels (117A, 117B or 117C), such that the stop collar 720 is in contact with a stop flange (123A, 123B or 123C). The end of the guide-hole forming portion 718 of the drill bit 701 is at about a centerline 1010 of the workpiece 704.

It is also possible to use the various adjustable holding systems described herein with an angular workpiece which has an angle between two abutting sides of less than 90 degrees. In one embodiment the angle is about 45 degrees, such as in a typical miter joint. In another embodiment, the angle is about 22.5 degrees ("octagonal angle"). In another embodiment, the angle is about 30 degrees ("hexagonal angle").

Figure 11:
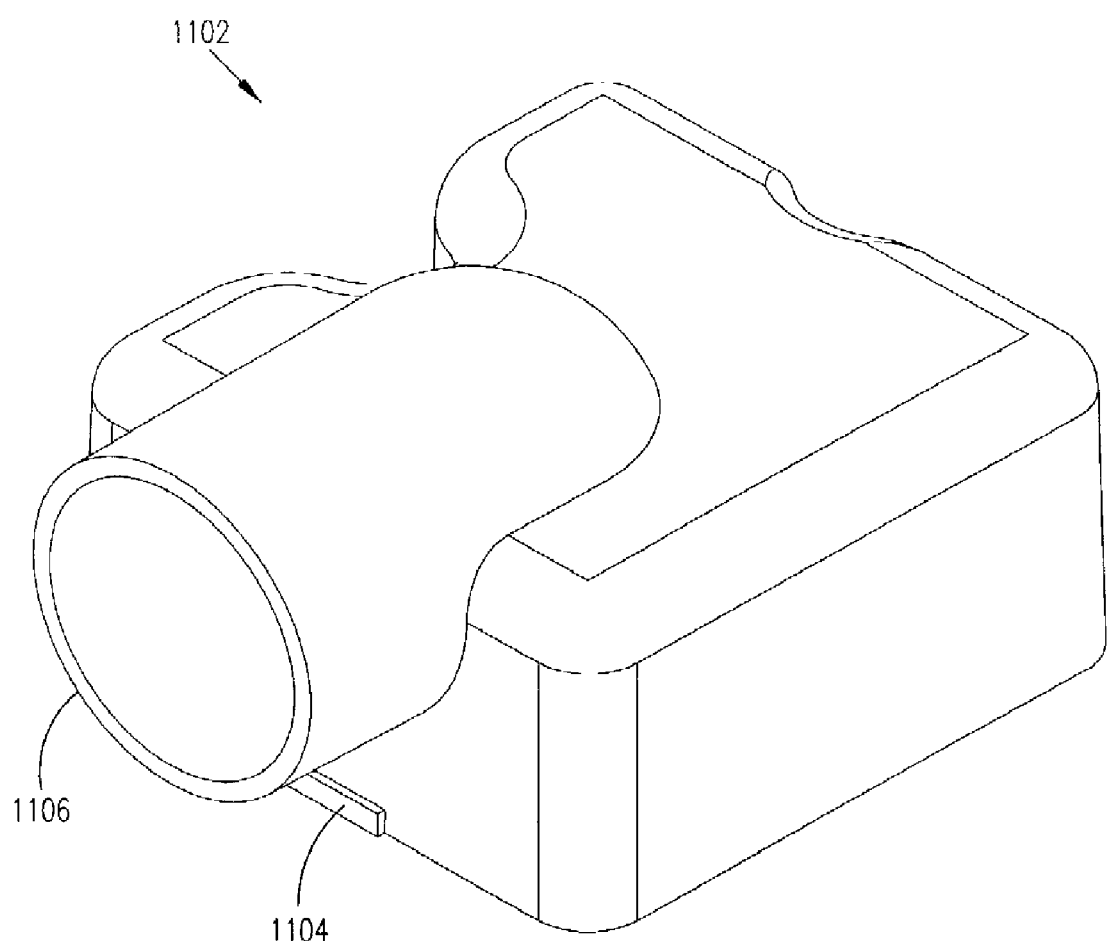
FIG. 11 is a perspective view of a dust catcher which can be used with the fixed base in one embodiment of the present invention.
Figure 12A:
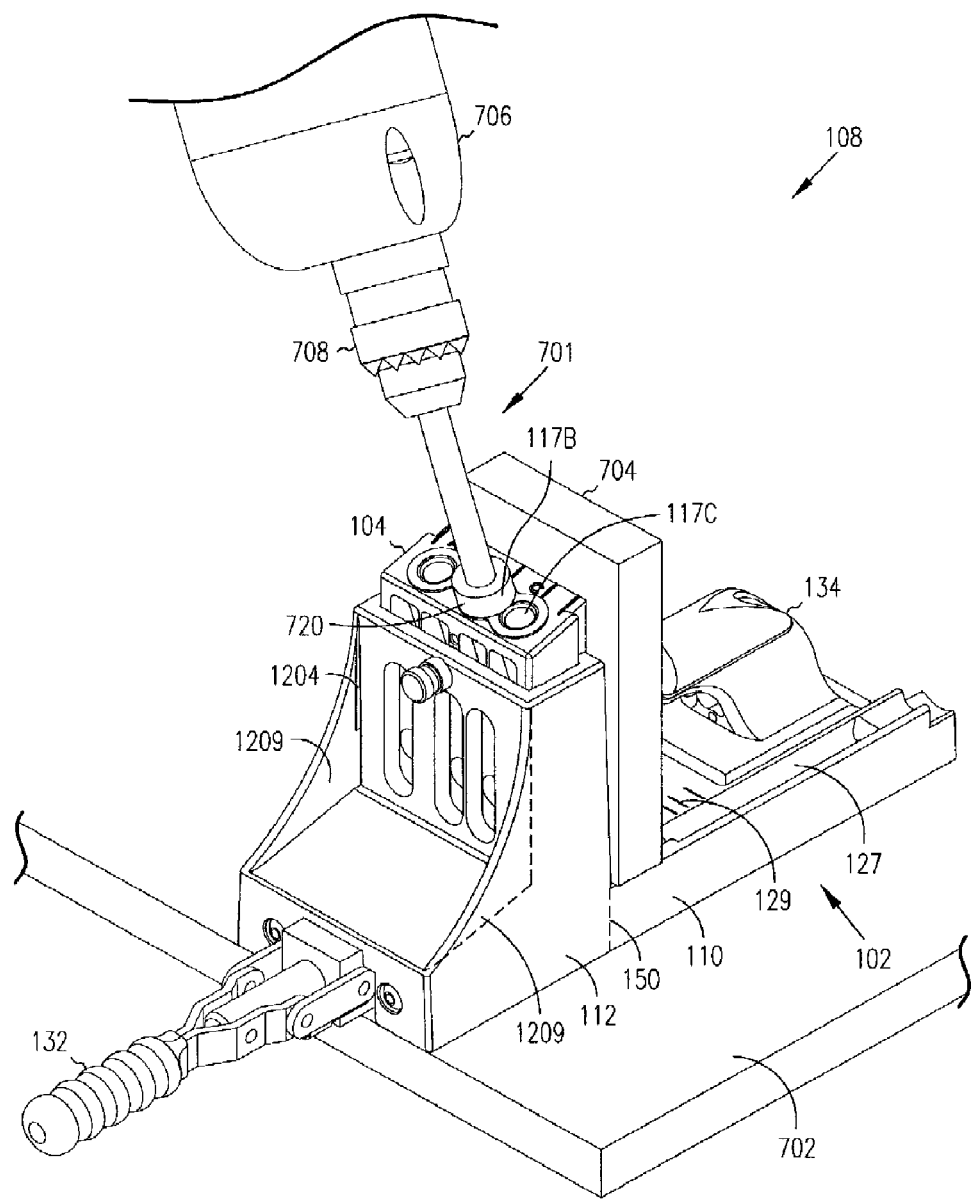
FIG. 12A is a back perspective view of an alternative fixed base with cutouts on gusset portions of the L-shaped base to accommodate tabs on the dust catcher in FIG. 11 in one embodiment of the present invention.
Figure 12B:
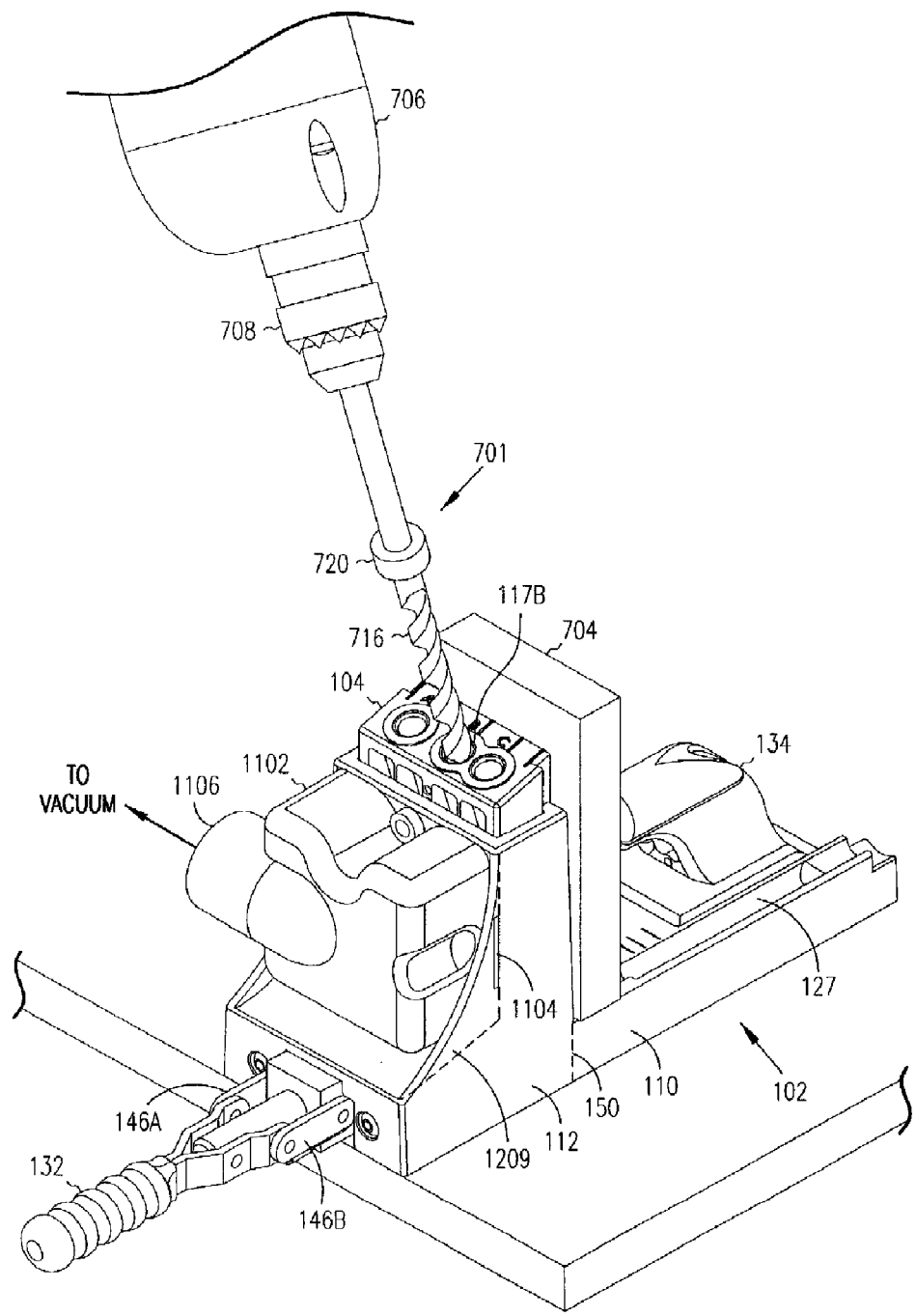
FIG. 12B is a back perspective view of the fixed base of FIG. 12A with the dust catcher in FIG. 11 installed in one embodiment of the present invention.

FIG. 11 is a perspective view of an optional dust catcher 1102 which can be used with embodiments of the adjustable holding system 100 in conjunction with a vacuum device (not shown). In one embodiment, the dust catcher 1102 has an integral port 1106 as shown in FIG. 11, although the invention is not so limited. Any suitable design can be used to allow the dust catcher 1102 to interact with any suitable type of vacuum device. The dust catcher 1102 can be secured to the adjustable holding system 100 in any suitable manner. In one embodiment, tabs 1104 (one shown) on opposing sides of the dust catcher 1102 are inserted into openings 1204 in alternative gussets 1209 shown in FIG. 12A, thus securing the dust catcher 1102 in position. The drill bit 701 in FIG. 12A is shown fully inserted into guide channel 117B. FIG. 12B shows the dust catcher 1102 installed on an adjustable holding device 100. The drill bit in FIG. 12B is shown ready to insert into guide channel 117B.

Figure 13:
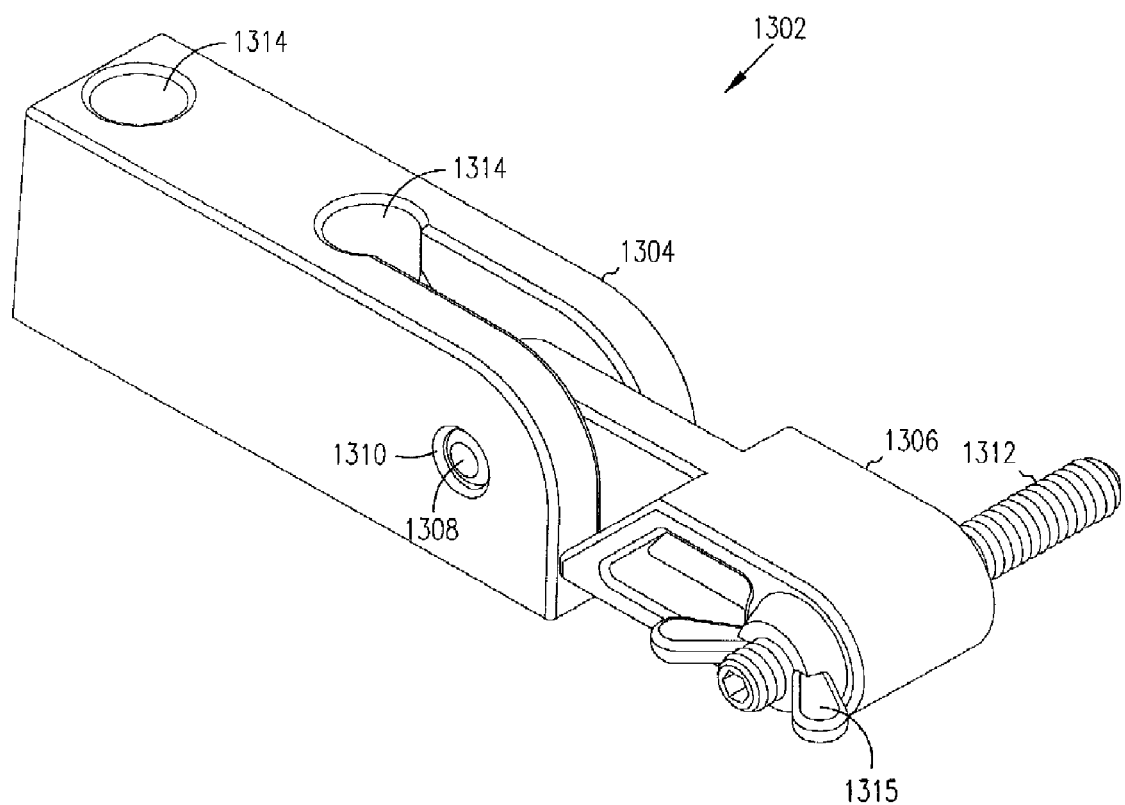
FIG. 13 is a front perspective view of an optional support-stop which can be used with a fixed base or portable base, the support-stop shown in a first position in one embodiment of the present invention.
Figure 14A:
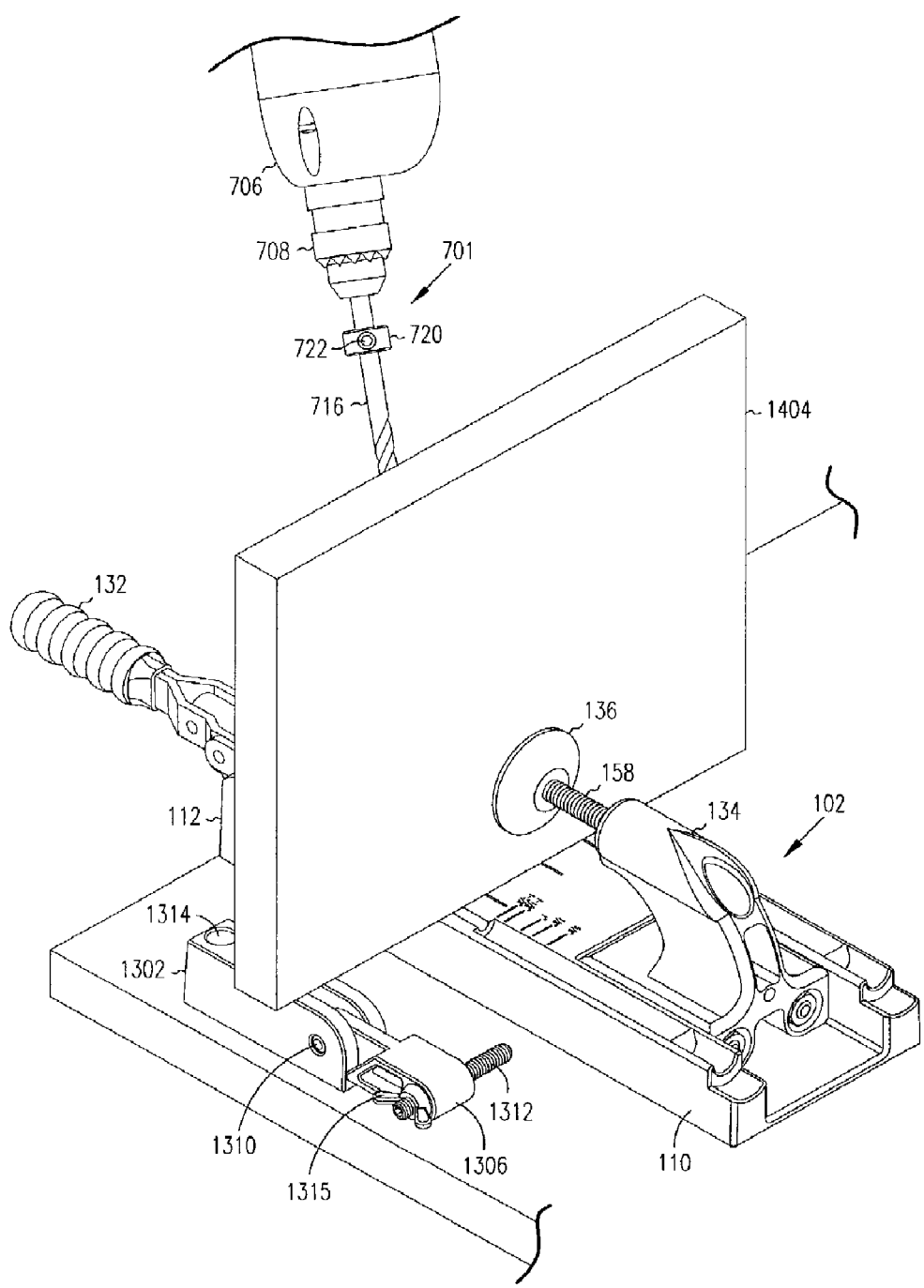
FIG. 14A is a front perspective view of the support-stop of FIG. 13 in use as a support with a fixed base in one embodiment of the present invention.
Figure 14B:
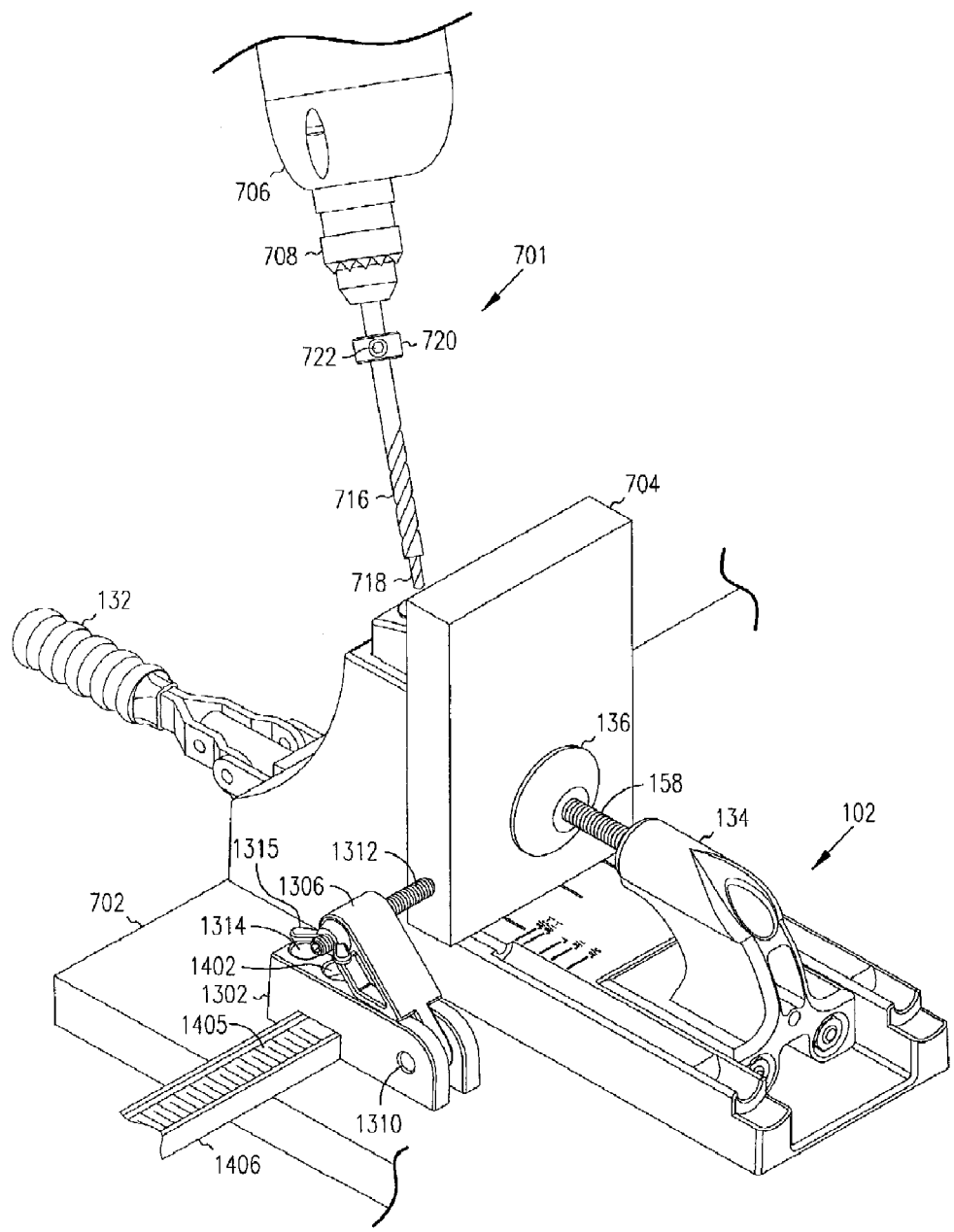
FIG. 14B is a front perspective view of the support-stop of FIG. 13 in use as a stop with a fixed base in one embodiment of the present invention.

Various other embodiments of the adjustable holding system 100 are also possible. FIG. 13 is a front perspective view of an optional support-stop 1302 which can be used together with the adjustable holding system 100 as shown in FIGS. 14A and 14B (or together with the portable adjustable holding system 1500 shown in FIG. 15B). The support-stop 1302 comprises a main body 1304 and a pivot arm 1306 which pivots on a pivot rod 1308 press fit into side openings 1310 in the main body 1304 as shown (and through corresponding openings in the pivot arm 1306, not shown). After the main body 1304 is secured onto a work surface, the pivot arm 1306 is moved to the desired location. The "friction fit" between the three pieces (main body 1304, pivot arm 1306 and pivot rod 1308) holds the pivot arm 1306 in position. The friction fit is accomplished by assembling these components together immediately after being removed from the mold, i.e., while still "hot." A threaded rod 1312 inserted through an opening in the pivot arm 1306 is used in conjunction with a wing nut 1315 as a fine-tuning adjustment for the support-stop 1302.

When secured in a down position as shown in FIG. 13 and FIG. 14A (or even a partially down position), the support-stop 1302 provides additional support for a larger workpiece 1404 as shown in FIG. 14A. Such larger workpieces may include cabinet panels, and "heavier-dimension" materials, such as "2.times.4's" (5.1.times.10.2 cm) to "2.times.12's" (5.1.times.30.5 cm), although the invention is not so limited. In one embodiment, the workpiece 1404 is a cabinet panel ranging in size from smaller than 8".times.12" (20.3.times.30.5 cm) up to about "24.times.36" (61.times.91 cm) or more. When secured in an "up" position, the support-stop 1302 functions as a stop. In this way, one or two pocket holes in a group of narrow workpieces can be consistently located when the stop is placed on one side or the other of either the fixed base 102 or the portable base 1502 and the workpiece is pushed up against the threaded rod 1312. The stop position can be fine-tuned with the threaded rod 1312 and is locked into position with the wing nut 1315.

FIG. 14B is a front perspective view of a modified support stop 1302 which has had a notch cut out of the bottom to accommodate a T-track 1406 as shown, although the invention is not so limited. However, use of a track, such as a T-track 1406 together with a measuring device 1405, such as a conventional tape measure, allows pocket holes to be consistently spaced across a panel. The T-track 1406 is also useful with the stop-support 1302 in the support position as it can easily locate the stop-support 1302 which may otherwise be partially or completely hidden beneath a workpiece.

In the embodiment shown in FIG. 14B, the T-track 1406 has the shape of an inverted "T" although the invention is not so limited. The T-track 1406 is secured to the support-stop 1302 by any suitable means. Preferably the securing mechanism does not interfere with movement of the measuring device 1405. In one embodiment, a screw is placed through a T-track hole 1402 in the support-stop 1302 and into a T-track nut (not shown), which itself engages the T-track 1406.

Depending on where the threaded rod 1312 is located, the support-stop 1302 can be placed varying distances from the fixed base 102, i.e., it can be adjacent to or separated from the fixed base 102. Multiple units of the support-stops 1302 can be combined for drilling consistently spaced pocket holes in a wide workpiece. In such an embodiment, each support-stop 1302 can be pivoted up or down to function either as a stop or a support, as desired. In other embodiments, support wings as described in '937, supra, are used in combination with the adjustable holding system 100.

The support-stop 1302 can be made from any suitable material, but is preferably made from molded plastic. Each support-stop 1302 can be any suitable size and shape, although each is preferably about the same height as the fixed base 102 to provide added support for larger workpieces when the pivot arm 1302 is in the down position. In one embodiment, the support-stop 1302 is about 2.5 to three (3) ins (about six (6) to 7.5 cm) in length and about 0.75 to one (1) inch (about two (2) to 2.5 cm) in width.

The support-stop 1302 is secured to a work surface by any suitable means, such as with screws placed through one or more countersunk screw mounting holes, such as the mounting holes 1314 shown in FIG. 13. In one embodiment, the support-stops 1302 are positioned to be flush or contiguous with the top surface 113 of the fixed base 102. In one embodiment, a support-stop 1302 is used as a stop together with the portable base 1502. In yet other embodiments, the support-stops 1302 or multiple support stops are used as support for a workpiece together with either the fixed base 102 or the portable base 1502.

As discussed above, the guide assembly 104 shown in FIG. 1 can be used together with a portable base secured to a work surface, such as the portable base 1502 shown in FIG. 15A. The portable base 1502 can be secured to a conventional work surface in a manner similar to a fixed base (102). Additionally, the portable base 1502 can be secured to alternative work surfaces, which is useful when performing remodeling or repair work, which may require working in tight or awkward positions, such as a preassembled box.

The portable base 1502 generally has the same configuration and dimensions as described above for the sides, front, back and bottom surface which define the fixed base opening 111 of the fixed base 102. Specifically, the back surface 1523 has portable base exit holes 1513A, 1513B and 1513C and a locating pin opening 1525. The front surface of protrusions 1521 on the bottom surface 1520 again support a workpiece (not shown) and are designed to maintain a coplanar relationship between the two partial front surfaces 1630 (one shown in FIG. 16) and the front surface of the guide assembly 104 during clamping and drilling. The portable base 1502 further includes a "lip" 1503 contiguous with the bottom surface as shown in FIGS. 15A and 15B and, more clearly, in FIG. 16 to support a workpiece as discussed herein. In this way, the guide assembly 104 can be used in a variety of applications, since it can be used together with either a fixed base or the portable base 1502. With the additional benefit of using guide channels having fixed spacing, alignment between the guide channels is maintained while moving the guide assembly 104 from one base to another. The use of varied spacing between the guide channels provides the additional benefits as described in '911, supra, although the invention is not so limited.

FIG. 15B shows an adjustable holding system 1500 comprising the guide assembly 104 and portable base 1502. As FIG. 15B shows, the guide assembly 104 is insertable into the portable base 1502. Prior to drilling, the guide assembly 104 is first aligned with the portable base 1502 using markings (202) shown in FIG. 21. Again, these markings (202), located on the side of the portable base 1502 and visible in FIG. 21, correspond with the thickness of the workpiece being drilled.

In one embodiment, markings 1530 are also present on the front of the portable base 1502. In the embodiment shown in the FIG. 15B, these markings 1530 correspond with conventional workpiece thicknesses. When a drill bit 701 is inserted through one of the guide channels 117A, 117B or 117C, as shown in FIG. 15B, it can be adjusted (with the set screw 722 on the stop collar 720) until the top edge of the guide hole forming portion 718 is aligned with the desired marking 1530. In this way, the stop collar 720 is now adjusted properly for the desired material thickness. In the embodiment shown in FIG. 15B, the top edge of the guide hole forming portion 718 is at a height of about ¾" which corresponds with a material having a thickness of approximately 0.75 ins (about 1.9 cm). In an alternative embodiment, the stop collar 720 is adjusted by any method known in the art. Again, the guide assembly 104 can be positioned at virtually any height within the portable base 1502 (as long as it can remain secure during drilling) and is not limited to any particular height. Guide assembly positioning marks 180A, 180B and 180C discussed above can also be seen in FIG. 15B.

Figure 16:
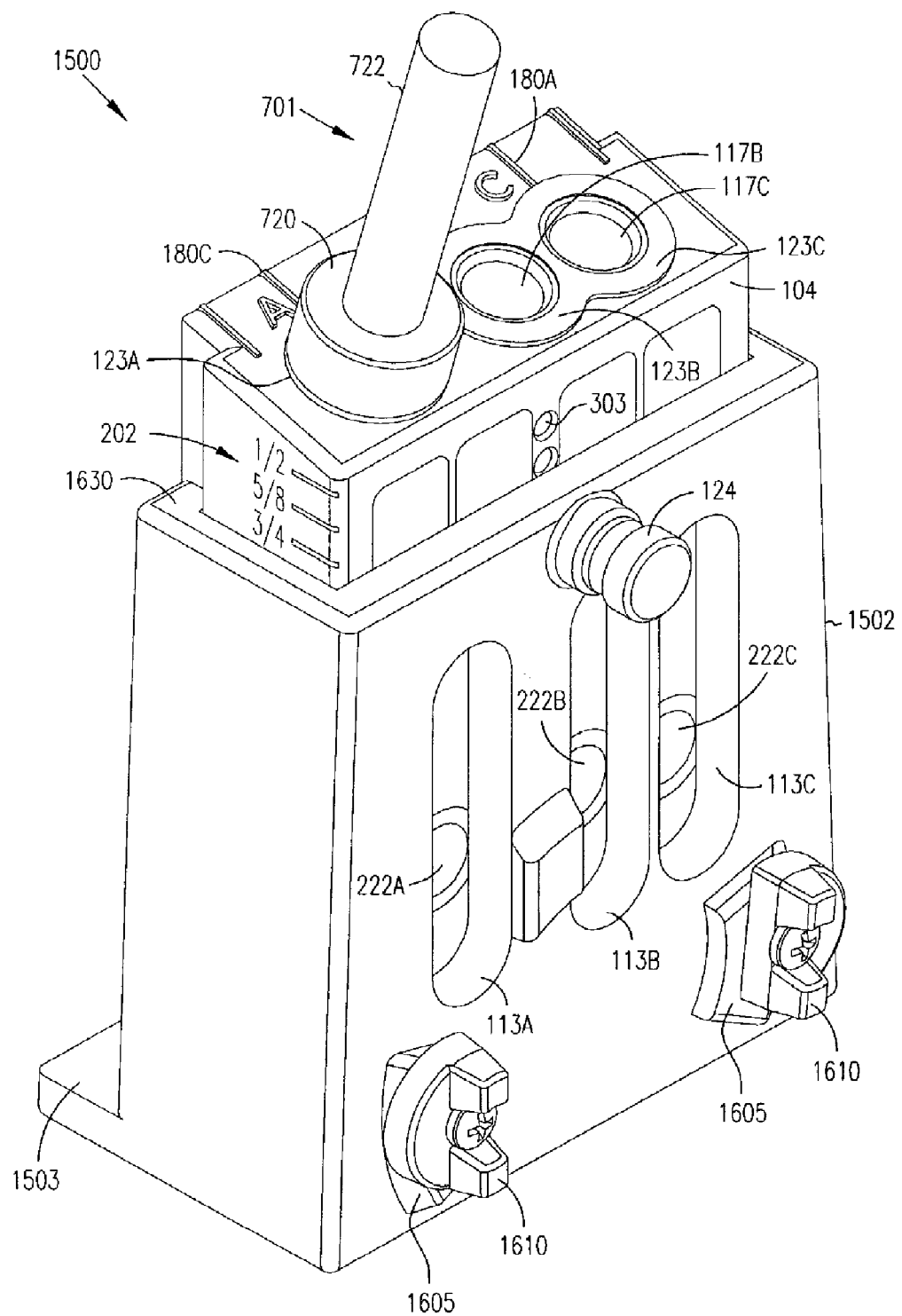
FIG. 16 is a back perspective view of the guide assembly and portable base in FIG. 15B in one embodiment of the present invention.

In the embodiment shown in FIG. 16, the guide assembly 104 is secured in place with the locating pin 124 at a point just below the ¾-inch (1.9 cm) marking 202, which is appropriate for a workpiece (not shown) having a thickness of greater than about ¾ ins. (1.9 cm) but less than about ⅞ ins (0.9 cm). By aligning the guide assembly 104 with the markings 202 corresponding with the thickness of the material, each pocket hole drilled will be properly centered in the material. A stepped drill bit 701 has also been inserted into a guide channel, in this example, guide channel 117A. As FIG. 16 shows, when fully inserted, i.e., at maximum drilling depth, the depth collar 720 is in contact with the stop flange, e.g., 123A, as is known in the art. Use of the depth collar 720 also prevents damage to the adjustable holding system 1500 (or 100), since the end of the stepped drill bit 701, (i.e., the end of the guide hole forming portion 718) is prevented from extending through to the other side of the workpiece.

Figure 17:
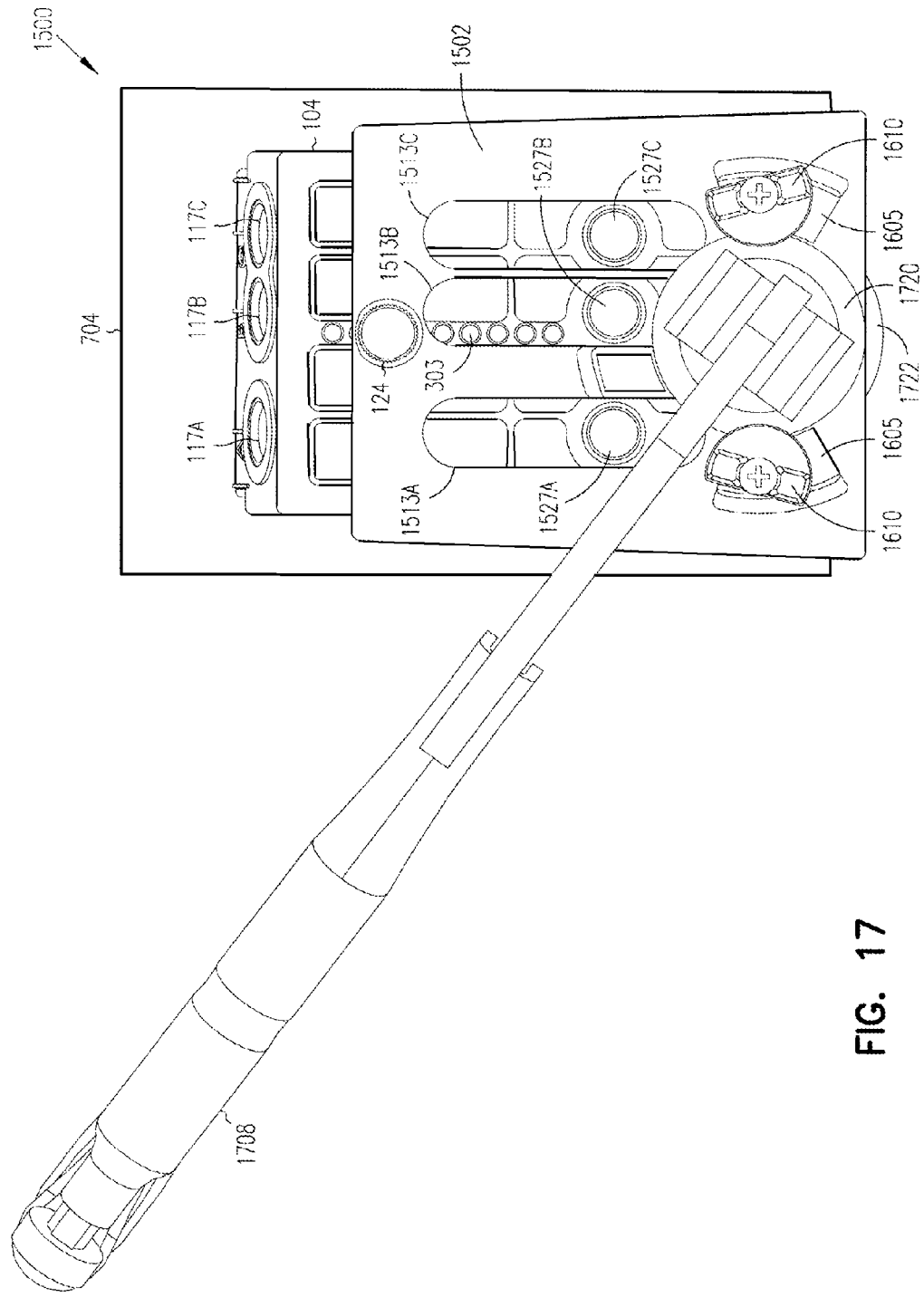
FIG. 17 is a back view of the guide assembly and portable base in FIG. 15B with a workpiece clamped thereto in one embodiment of the present invention.

Referring to FIGS. 16 and 17, a novel pair of holders 1605 located on opposing sides of the back surface of the portable base 1500 is used to hold a handheld clamp 1708 in position. As shown in FIG. 17, a first rotating disk 1720 of the handheld clamp 1708 can be contained within the holders 1605. Rotating knobs 1610 can be rotated in either direction, i.e., in an "open" or "closed" position, to secure or unsecure, respectively, the first rotating disk 1720 positioned within. In this way, the handheld clamp 1708 can still move or swivel prior to clamping down the workpiece 704 with a second rotating disk 1722. Additionally, when the portable base 1502 is secured to a work surface, a clamp, such as the handheld clamp 1708 shown (which can be a C-clamp or any other type of handheld clamp) can be held in a "ready position" to accept a series of workpieces in the same manner as a dedicated clamp used with a fixed base (e.g., a toggle clamp). Once all of the desired drilling is completed, the knobs 1610 on the holders 1605 can be rotated or opened, thus allowing removal of the handheld clamp 1708. In an alternative embodiment, other types of holders are used to secure the handheld clamp 1708 to the portable base 1502 such as slides, pins, magnets, and the like.

Figure 18:
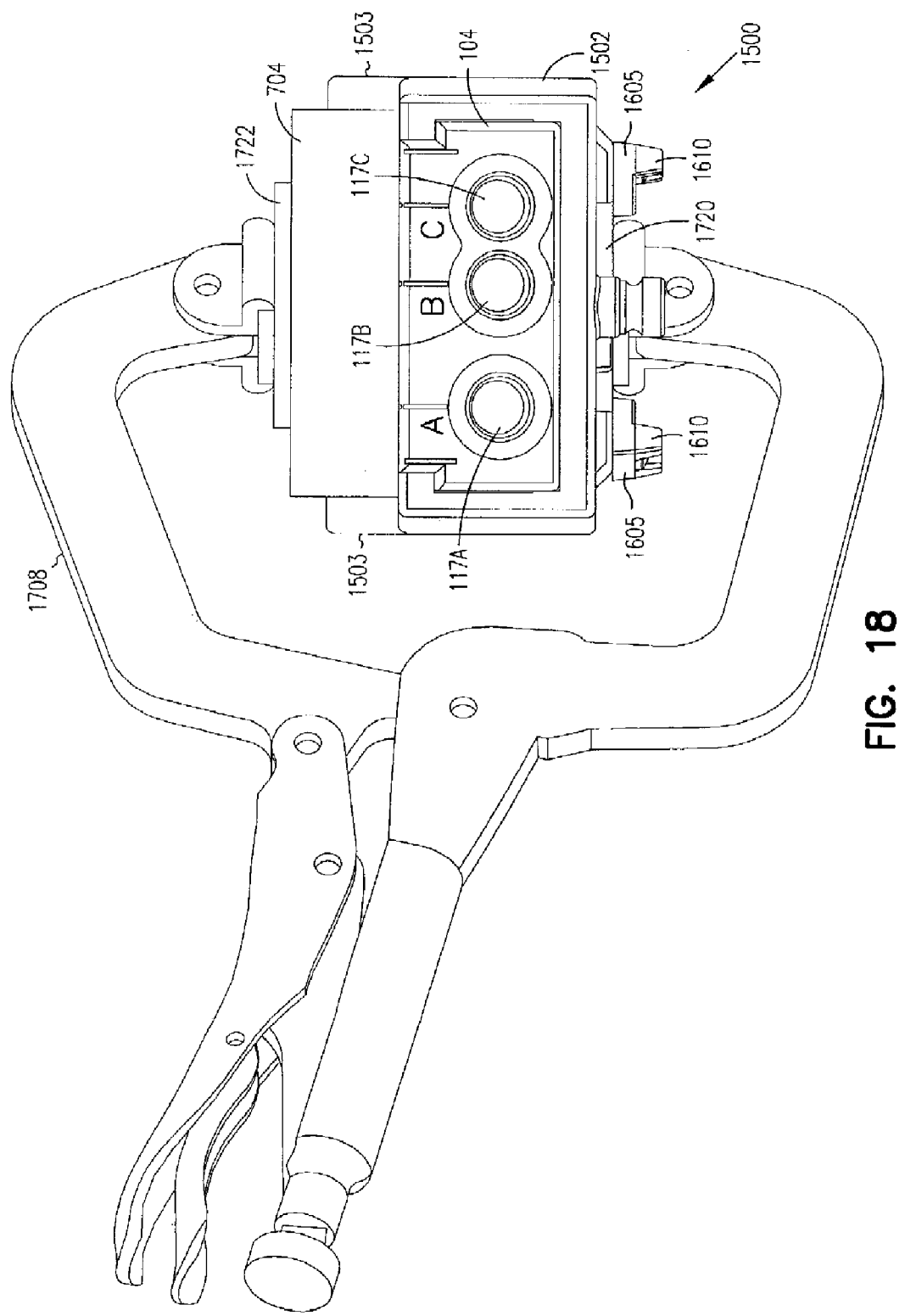
FIG. 18 is a top view of the guide assembly and portable base in FIG. 15B in one embodiment of the present invention.

FIG. 18 is a top view of the guide assembly and portable base of FIG. 15B in one embodiment of the present invention. As this view shows—the workpiece 704 is securely clamped to the front face of the adjustable holding system 1500 as the guide assembly 104 and portable base 1502 form a co-planar surface.

Figure 19:
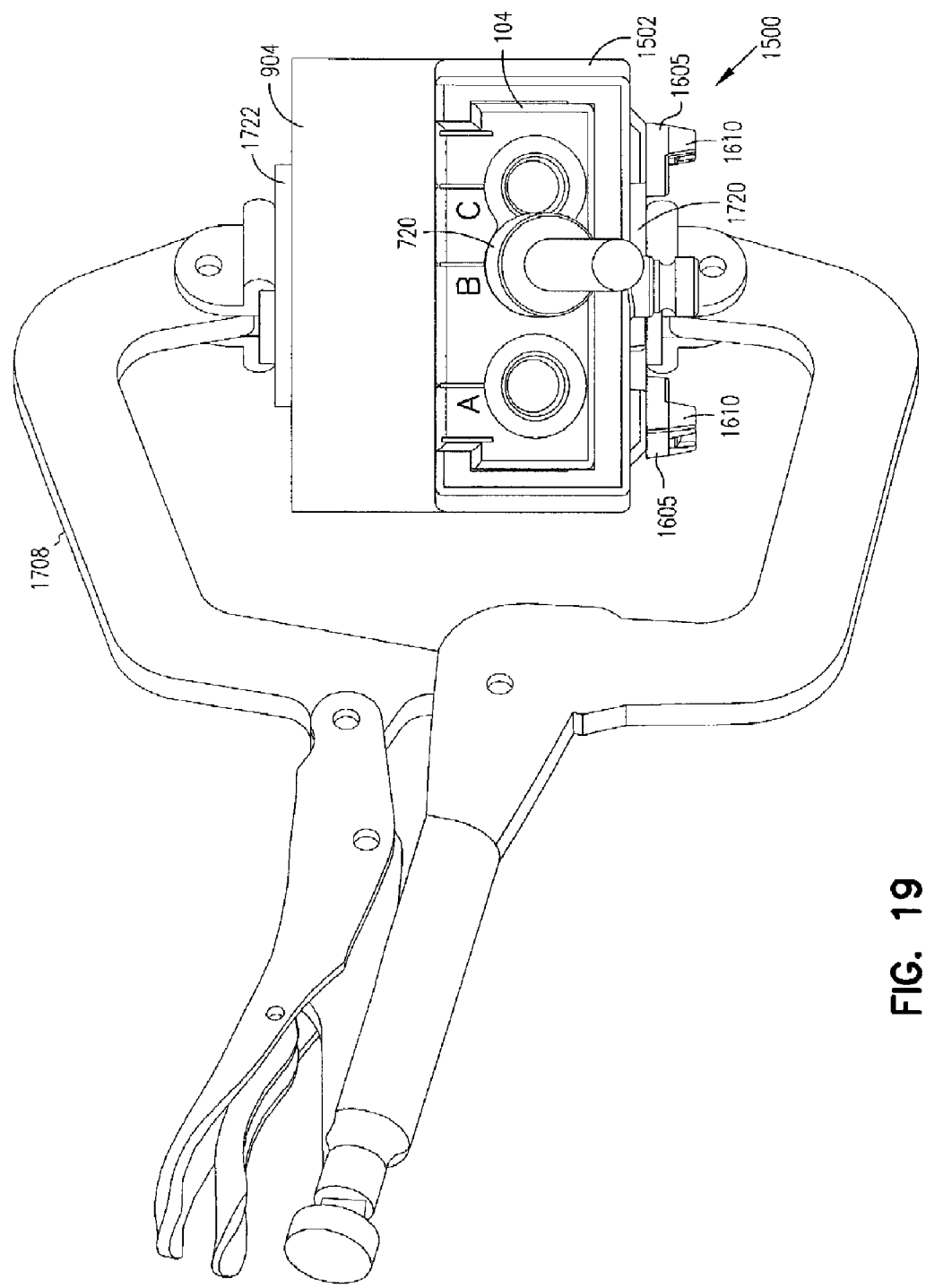
FIG. 19 is a top view of the guide assembly and portable base in FIG. 18 with a thicker workpiece clamped thereto in one embodiment of the present invention.

FIG. 19 is a top view of the guide assembly and portable base of FIG. 18 with a thicker workpiece clamped thereto in one embodiment of the present invention.

Prior to clamping the thicker workpiece 904 the stop collar 720 is adjusted to accommodate the new thickness. In one embodiment, the stop collar 720 is adjusted using the method described above with FIG. 15B. In another embodiment, any method to adjust the stop collar 720 can be used.

Figure 20:
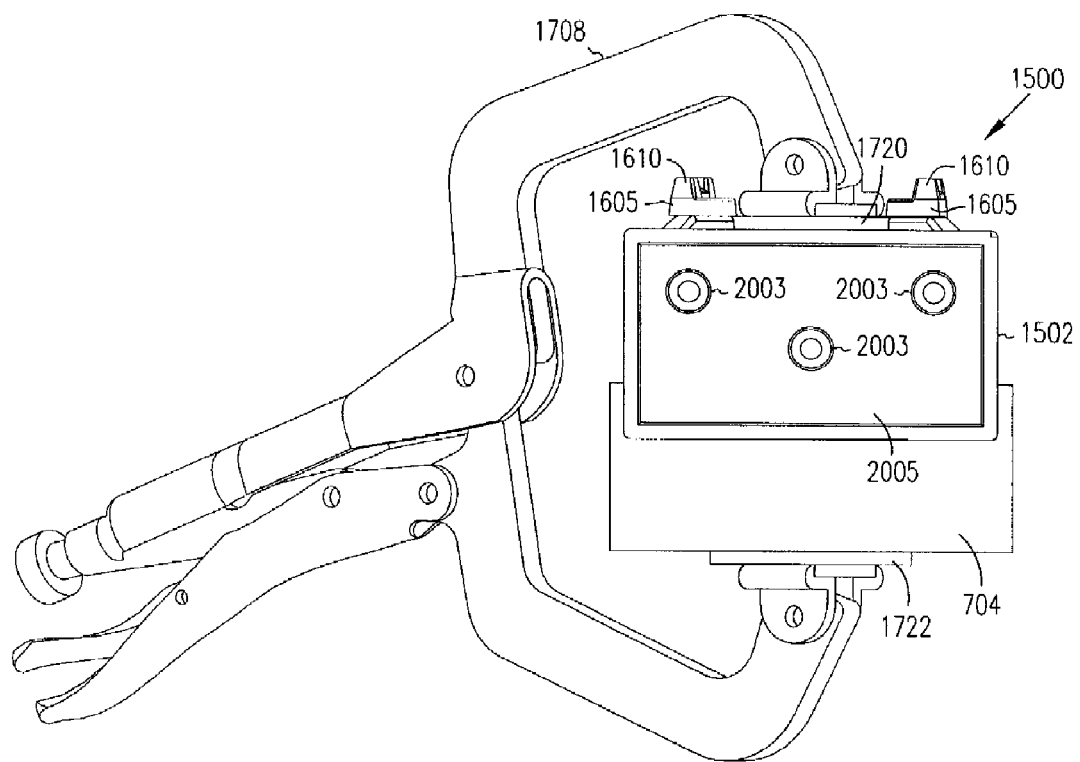
FIG. 20 is a bottom view of the guide assembly and portable base in FIG. 18 in one embodiment of the present invention.

FIG. 20 is a bottom view of the adjustable holding system 1500 showing a substantially horizontal guide assembly bottom surface 2005. The adjustable holding system 1500 can be secured to a work surface (such as the work surface 702 shown in FIG. 21) in any suitable manner as discussed above. In one embodiment, recessed holes 2003 are provided in the bottom of the guide assembly 104 as shown in FIG. 20. Three recessed holes 2003 are shown in this embodiment, although any suitable number of recessed holes 2003 can be provided. The substantially horizontal guide assembly bottom surface 2005 provides an additional advantage in that the guide assembly 104 itself can be secured to a work surface, if desired, without the use of either a fixed base 102 or a portable base 1502.

Figure 21:
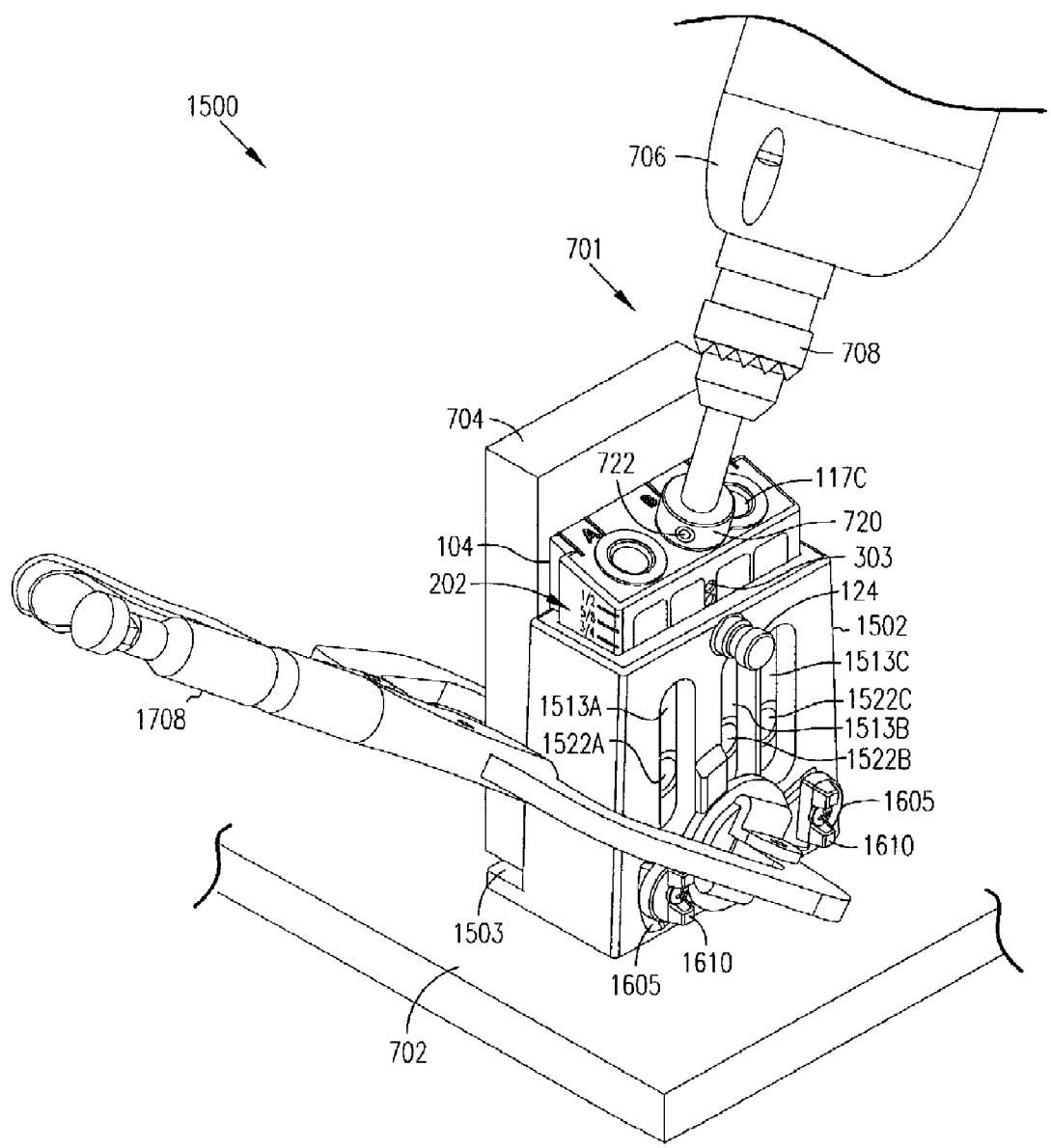
FIG. 21 is a back perspective view of the guide assembly and workpiece in FIG. 17 secured to a work surface.

FIG. 21 is a back perspective view of the portable base 1502 secured to a work surface 702. In this view, placement of the workpiece 704 on the lip 1503 of the portable base 1502 can be seen. A drill bit 701 is about to drill a hole into the workpiece 704. As noted throughout, the workpiece 704 can range in thickness from about ½ inch (about 1.27 cm) up to 1-1.5 ins (about four (4) cm) or more.

The various components described herein can be made from any suitable material. In particular, the fixed base 102, portable base 1502 and guide assembly 104 shown in FIG. 1 and FIG. 15B, can each be made from any suitable material or any combination of materials, such as wood, wood composites, any type of plastic (e.g., nylon, polyethylene, polystyrene, and so forth), any type of magnetic metal or metal alloy (e.g., steels), nonmagnetic metal alloy (e.g., aluminum, aluminum alloys), and so forth. In one embodiment 6063-T5 aluminum alloy is used. In another embodiment, a glass-filled, type 66 nylon is used. Use of a plastic fixed base 102 may also provide a more rigid holding device as compared with certain types of conventional aluminum devices. Each guide channel 117A, 117B and 117C can also be made of any suitable material, such as hardened steel.

The fixed base 102 or portable base 1502 and guide block holder 190 described above (See FIGS. 1, 2, and 15A) can be made by using any suitable process, such as extrusion, injection molding, casting, and so forth. When produced in a die with an extrusion process, material-savings techniques can also be used, including forming openings on the back side of the guide block holder 190 (See FIG. 3). Furthermore, if the openings are made substantially symmetrical, as shown in FIG. 3, the material flows through the die more easily and uniformly. The openings do not need to be of any particular shape or size or located in any particular area of the guide block, as long as the guide block holder 190 is structurally sound and has dimensional stability. Such openings also help the resulting extrudate cool faster. Similar techniques can be used on the bottom side of the L-shaped base 102 if desired.

An added benefit of using injection molded plastic for the guide block holder 190 is that it allows the guide channels 117A, 117B and 117C to be inserted into the mold as a separate unit and secured into place during the molding process without causing weakening of the guide. Since temperatures are generally lower as compared with aluminum or metal fabrication processing, use of an injection molding process has the added benefit of preventing weakening of the guide channels 117A, 117B and 117C themselves. The injection molding process is also more efficient, thus reducing costs, as compared with the time and labor involved in machining guides into a comparable aluminum or metal guide. To obtain maximum joint quality, it is important for two pocket holes to be placed sufficiently close together on smaller-width workpieces and spread further apart on larger-width pieces. For example, two holes (as opposed to one) are typically used in attaching a rail to a stile of a cabinet or a leg of a table. Use of the adjustable holding systems of the present invention produce properly placed holes in materials of various widths (as well as various thicknesses).

It is also important to position a pocket hole a proper distance from the edge of a workpiece. Because a pocket hole is drilled at an angle, the closer a pocket hole is drilled to the edge of the wood, the closer a screw inserted into the hole will exit the opposing edge of the workpiece. Proper placement of the pocket hole allows a screw to exit as close to the center-of thickness of a material as possible, thus producing superior joint quality.

Figure 22A:
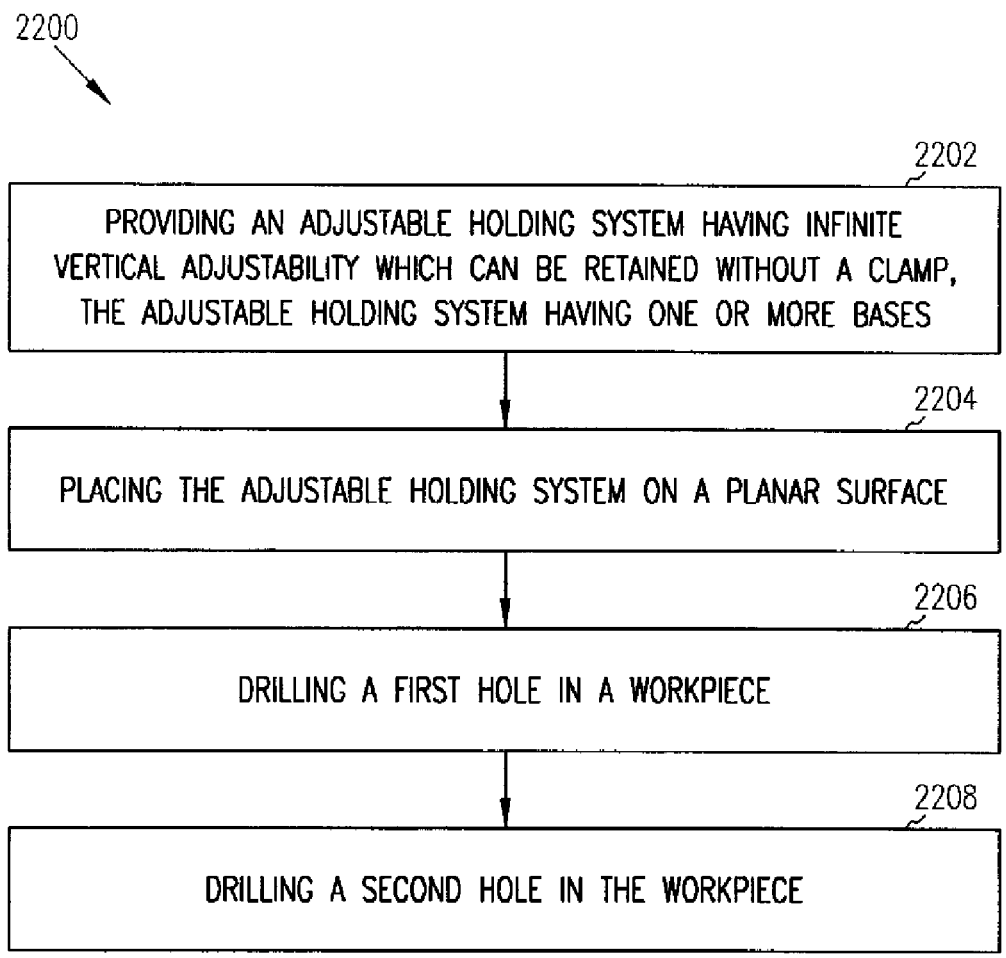
FIG. 22 is a block diagram showing a method of using the adjustable holding system in one embodiment of the present invention.

In one embodiment, the invention comprises methods for drilling pocket holes in a workpiece. FIG. 22A shows a method 2200 comprising providing 2202 an adjustable holding system having infinite vertical adjustability which can be retained without a clamp; placing 2204 the adjustable holding system on a planar surface; drilling 2206 a first hole in the workpiece; and drilling 2208 a second hole in the workpiece. In one embodiment, the adjustable holding system has a removable guide assembly securable to one or more bases. In one embodiment, the one or more bases is a fixed base having a clamp assembly, such as a rear actuated clamp assembly.

Figure 22B:
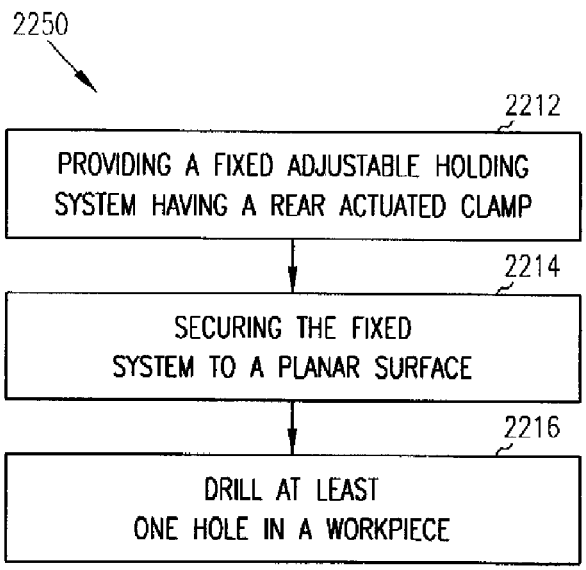

In one embodiment, the method 2250 is shown in FIG. 22B and comprises providing 2212 a fixed adjustable holding system having a rear actuated clamp; securing 2214 the fixed system to a planar surface; and drilling 2216 at least one hole in a workpiece.

Figure 22C:
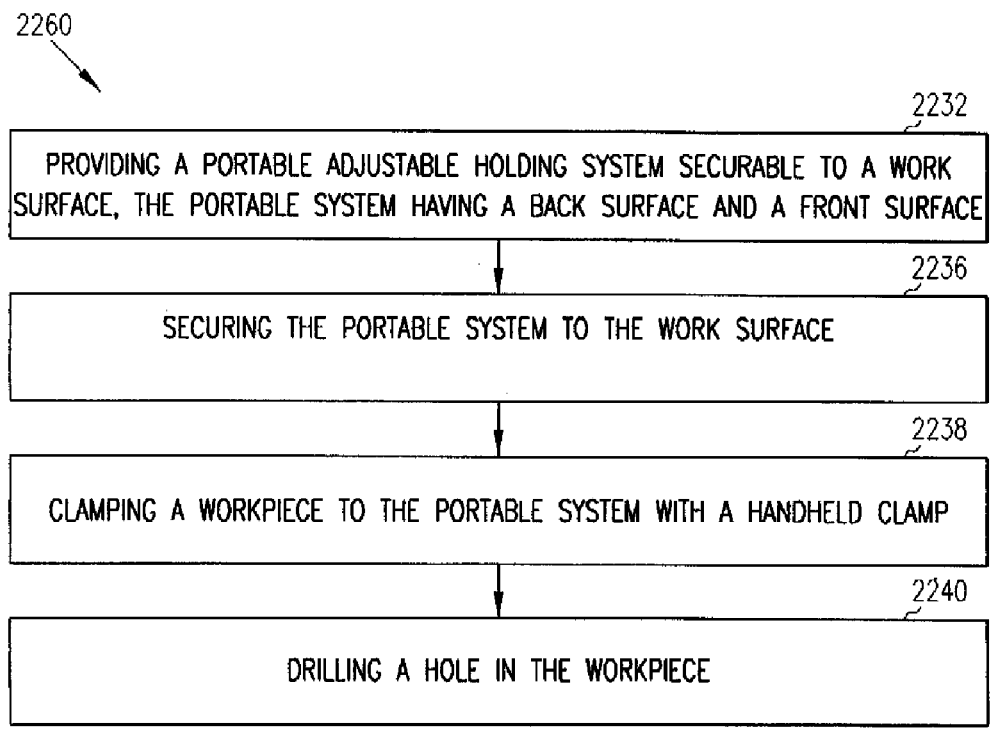

In one embodiment, the method 2260 is shown in FIG. 22C and comprises providing 2232 a portable adjustable holding system securable to a work surface, the portable system having a back surface and a front surface; securing 2236 the portable system to the work surface; clamping 2238 a workpiece to the portable system with a handheld clamp; and drilling 2240 a hole in the workpiece. In one embodiment, the method further comprises drilling another hole in the workpiece.

In one embodiment, the method further comprises securing a first retaining disk on the handheld clamp to the back surface, the handheld clamp further having a second retaining disk wherein the workpiece is clamped to the front surface with the second retaining disk.

In another embodiment, the method comprises providing an adjustable holding system which provides infinite vertical adjustability, the adjustable holding system having a removable guide assembly securable into a portable base or a fixed base. The method further comprises placing the adjustable holding system on a planar surface and drilling a first hole in the workpiece with a stepped drill bit having a depth collar, the workpiece clamped to the adjustable holding system with a clamp. In one embodiment, the clamp is secured to the fixed base. In another embodiment, the clamp is a handheld clamp. The method can further comprise drilling a second hole in the workpiece, wherein the first and second holes are both substantially perpendicular to the edge of the workpiece.

In one embodiment, the method comprises drilling two or more appropriately-aligned pocket holes in a workpiece having one thickness, removing the piece and drilling two or more appropriately-aligned pocket holes in a workpiece having a different thickness. In one embodiment, this is accomplished with the fixed base and dedicated clamp having spring action and fine tuning capabilities to accommodate different thicknesses of wood (e.g., rear-actuated clamp assembly). In another embodiment, this is accomplished with the portable base which can retain a first rotating disk of a handheld clamp in holders located on the backside while workpieces are being clamped and unclamped in front. In one embodiment, the method comprises drilling two or more appropriately-aligned pocket holes in a workpiece having one width, removing the workpiece and drilling two more appropriately-aligned pocket holes in a workpiece having a different width in a similar manner, although if the pieces are of the same thickness, no additional fine tuning of the dedicated clamp is necessary.

Figure 23:
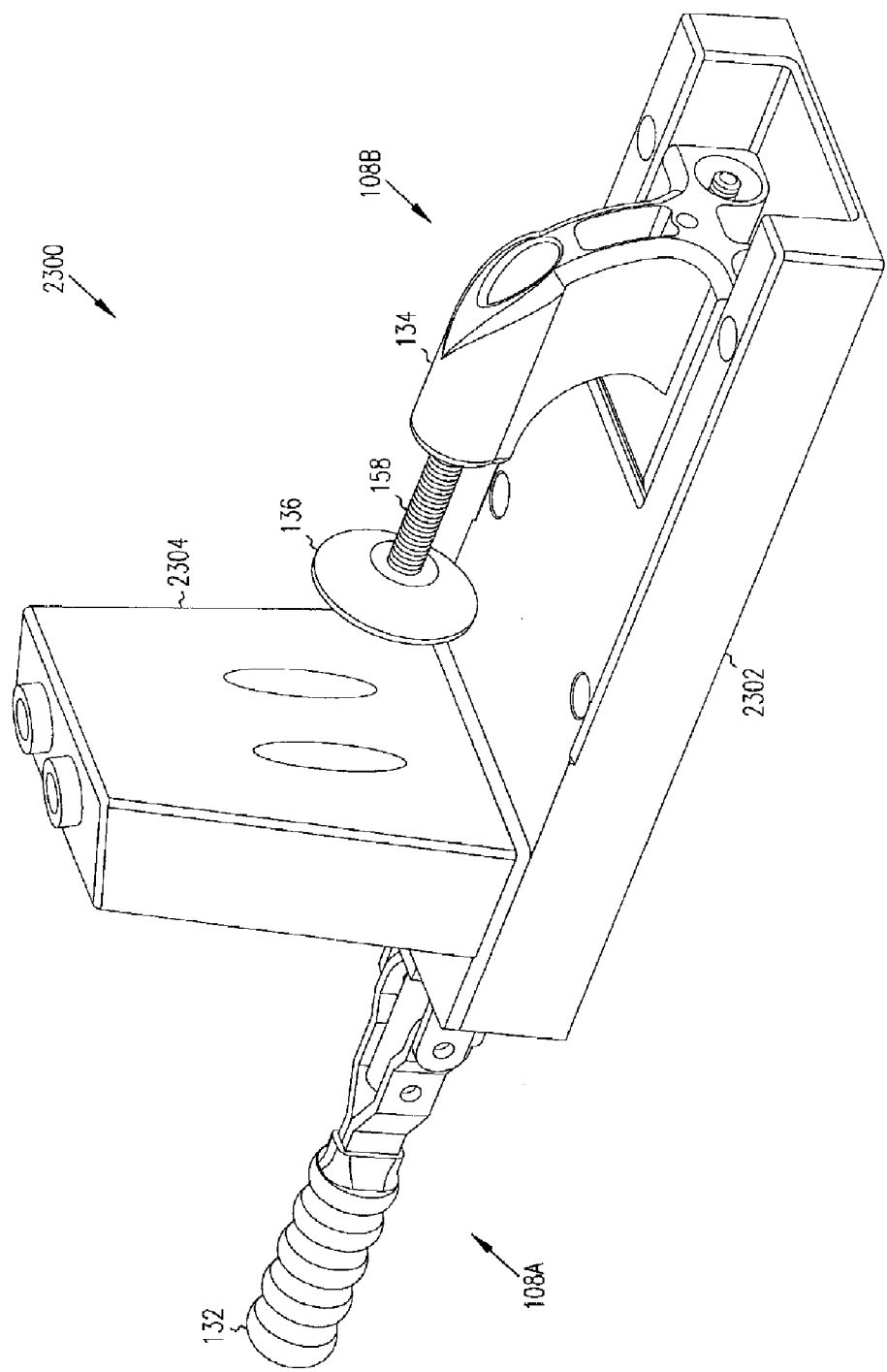
FIG. 23 is a front perspective view of an alternative fixed base comprising only a substantially horizontal portion in which the rear actuated clamp assembly is used in combination with a conventional fixed guide assembly in one embodiment of the present invention.

FIG. 23 is a front perspective view of an alternative fixed base system 2300 having a modified fixed base 2302 comprising only a substantially horizontal portion. In this embodiment, the alternative fixed base system 2300 further comprises the rear actuated clamp assembly comprising a handle-rod portion 108A and a clamp follower portion 108B. In this embodiment, these components are used in combination with a conventional fixed guide assembly 2304. Other possible embodiments can include a guide assembly having three guide channels of equal or varied spacing or use of a guide assembly having one guide channel, additional use of a dust catcher secured in any suitable manner, use of a support-stop, and so forth.

Figure 24:
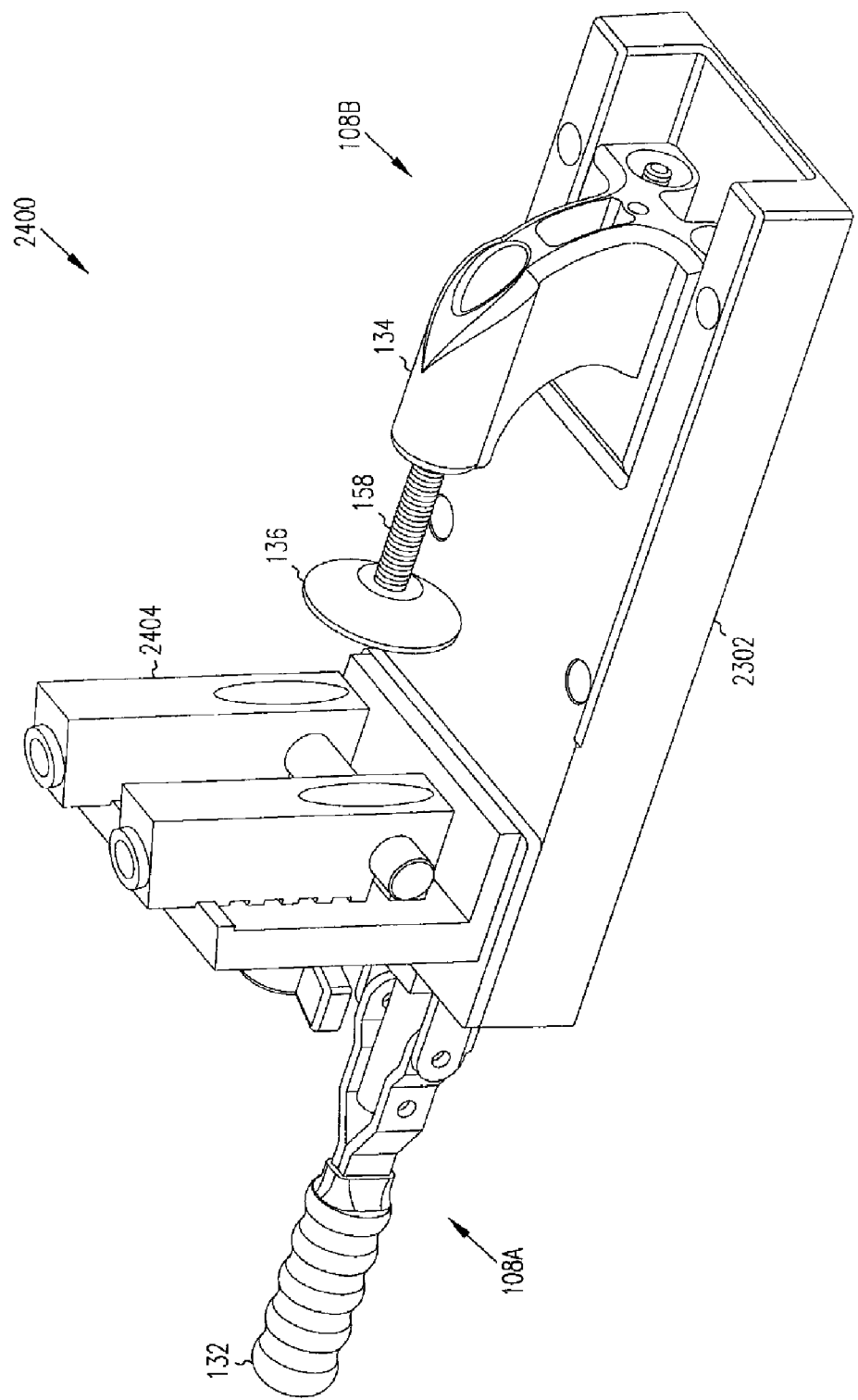
FIG. 24 is a front perspective view of the fixed base of FIG. 23 in which the rear actuated clamp assembly is used in combination with a conventional movable guide assembly in one embodiment of the present invention.

FIG. 24 is a front perspective view of an alternative fixed base system 2400 having the modified fixed base 2302 shown in FIG. 23. In this embodiment, the fixed base system 2400 further comprises the rear actuated clamp assembly comprising a handle-rod portion 108A and a clamp follower portion 108B. In this embodiment, these components are used in combination with a conventional movable guide assembly 2404. Other possible embodiments can include a fixed guide assembly having one or two holes, or a guide assembly having three or more holes with equal or varied spacing, additional use of a dust catcher secured in any suitable manner, use of a support-stop, and so forth.

Figure 25:
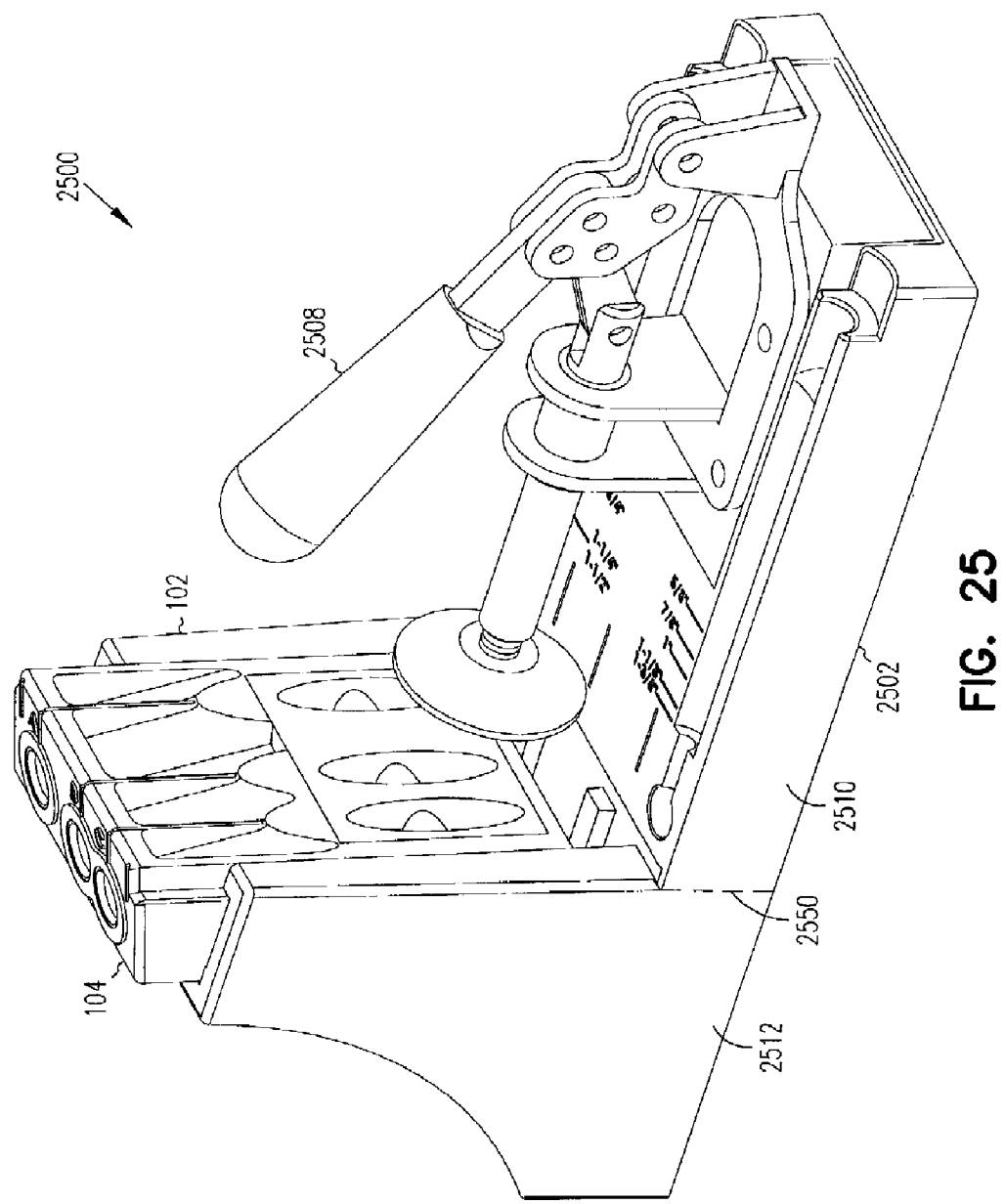
FIG. 25 is a front perspective view of another alternative fixed base in which the fixed base and guide assembly are used with a conventional front-actuated toggle clamp in one embodiment of the present invention.

FIG. 25 is a front perspective view of an alternative fixed base system 2500 in which a guide assembly 104 described herein is used together with a modified fixed base 2502 adapted to accommodate a conventional front-actuated toggle clamp 2508. Other possible embodiments can include a guide assembly having fewer than three guide channels, additional use of a dust catcher secured in any suitable manner, use of a support-stop, and so forth.

Figure 26:
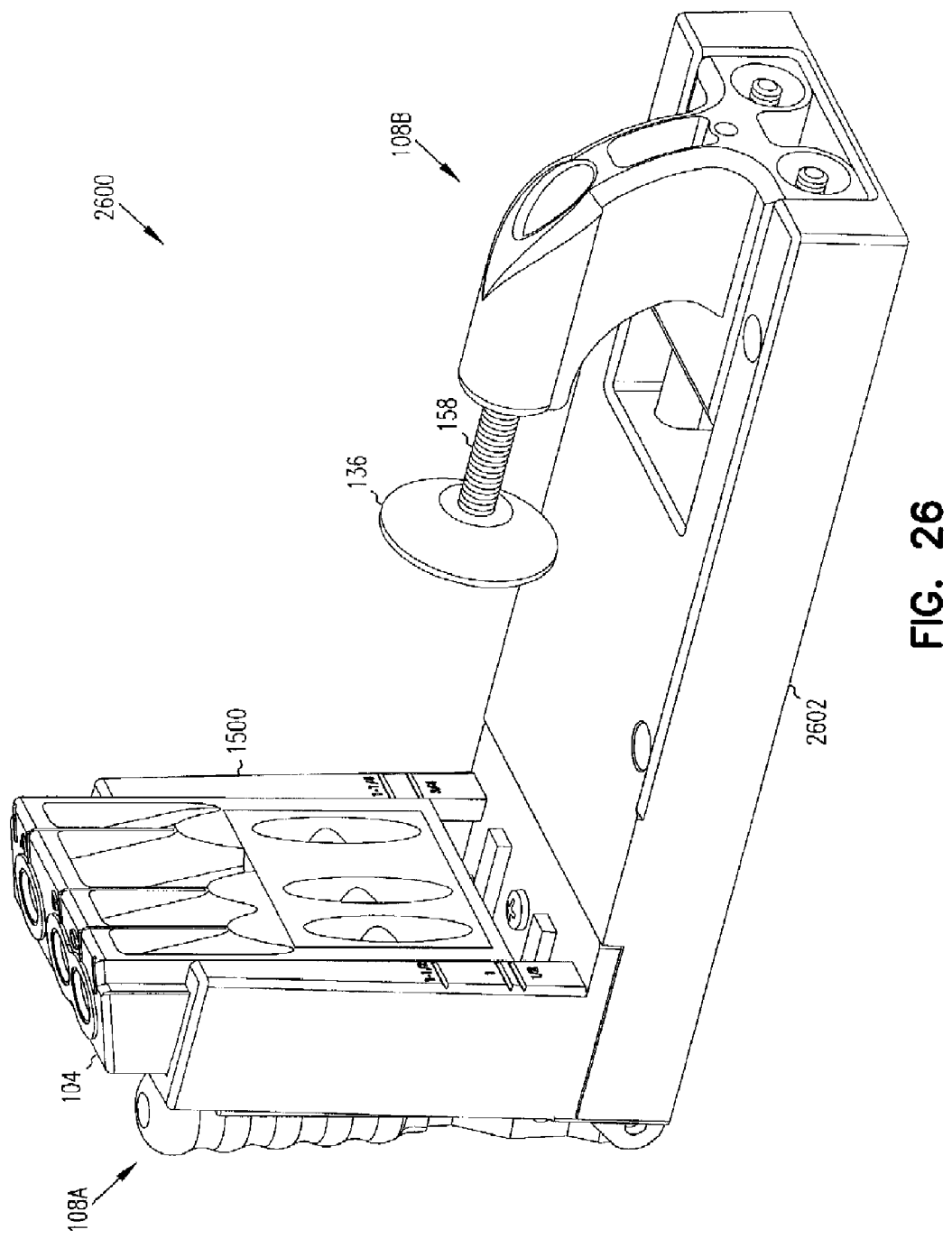
FIG. 26 is a front perspective view of yet another alternative embodiment of a fixed base having a substantially horizontal portion combined with a substantially vertically oriented portable base in one embodiment of the present invention.

FIG. 26 is a front perspective view of yet another alternative fixed base system 2600 comprising a fixed base 2602 with a substantially horizontal portion combined with a substantially vertically oriented portable base system 1500 in one embodiment of the present invention. The adjustable holding systems or jigs of the present invention provide greater flexibility in types of clamping and drilling operations available with a limited amount of components for a wider range of workpiece sizes than has previously been possible with conventional holding devices, yet allows the user to achieve customized and superior joint quality. The adjustable holding systems or jigs of the present invention allow a user, for the first time, to drill pocket holes in materials of various thicknesses using a guide assembly interchangeable between a portable base and a fixed base without the need for separate components, thus providing essentially infinite vertical adjustability of the guide assembly. The unique design of the guide assembly and base (i.e., portable base and/or substantially vertical portion of the fixed base) result in a co-planar relationship of the vertical surfaces of both components when the guide assembly is inserted therein, which provides a substantially smooth surface to support a workpiece in one or more drilling environments. In one embodiment, these novel features are combined with a guide assembly having fixed spacing between guide channels, such as fixed varied spacing. Use of fixed spacing eliminates the need to adjust the holding device or workpiece between drilling to obtain the desired spacing between pocket holes. In one embodiment, the use of a rear actuated clamp assembly with the fixed base allows users, for the first time, to conveniently clamp a workpiece into place without the need to reach around in front of the workpiece. This feature is particularly useful for larger workpieces. In another embodiment, the use of a dust catcher with the fixed base keeps the work area clean during operation and reduces cleanup time.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. An adjustable holding system comprising:
  a base adapted for use on a work surface, the base having at least one exit hole adapted to serve as a chip breaker by allowing waste material generated during drilling to exit a drilling area; and
  a guide assembly, adapted and arranged to be movable with respect to a portion of the base, having a guide channel disposed to receive and guide a shank of a drill bit, the guide assembly having at least one exit hole adapted to allow waste material generated during drilling to exit a drilling area.

2. The system of claim 1 further comprising a clamp assembly having a clamp follower adapted and arranged to be movably positioned proximate to a workpiece side, wherein the base comprises a base opening, and wherein the guide assembly is adapted and arranged to be movable within a portion of the base opening when the clamp assembly is in a clamped position with respect to the workpiece side.

3. The system of claim 1 wherein the base and the guide assembly are operatively coupled together to permit aligning of the base exit hole with the guide assembly exit hole to allow waste material generated during drilling to exit a drilling area through both exit holes.

4. The system of claim 1 wherein the base comprises a base opening defined by a back surface, two side surfaces, and a partial front surface and the guide assembly having a surface adapted and arranged to be adjacent to a workpiece side and being removably securable within a portion of the base opening wherein the guide assembly has infinite adjustability within the base opening while being interlocked with the base whereby a location for drilling a hole in the workpiece side can be predetermined by adjusting the guide assembly within the base opening.

5. The system of claim 4 wherein the base comprises a holder adapted and configured to accept a retaining disk of a handheld clamp.

6. The system of claim 5 further comprising another holder that collectively form a pair of holders for securing the retaining disk of the handheld clamp.

7. The system of claim 6 further comprising a knob rotatably attached to one of the holders such that the knob may be rotated to secure the retaining disk adjacent to the base.

8. The system of claim 4 wherein the base comprises a substantially horizontal portion integral with a substantially vertical portion that form an L-shaped base.

9. The system of claim 8 wherein the guide assembly is operatively configured within the base opening to have infinite vertical adjustability without use of an element located between the horizontal portion of the base and guide assembly.

10. The system of claim 4 wherein the base is a fixed base.

11. The system of claim 4 wherein the system further comprises a clamp assembly having a clamp follower adapted and arranged to be movably positioned proximate to another workpiece side opposite to the workpiece side adjacent to the front surface.

12. The system of claim 11 wherein the clamp assembly is rear actuated and wherein the base comprises an area adapted to house at least a portion of the clamp follower.

13. The system of claim 11 wherein the clamp assembly further comprises a clamping pad adjustably secured to the clamp follower and adapted to engage the other workpiece side when the clamp follower is moved into a clamped position.

14. The system of claim 13 wherein the clamping pad is rotatable on a threaded bolt which screws into a threaded opening in the clamp follower such that fine adjustments can be made by rotating the clamping pad along the threaded bolt towards the workpiece to contact the other workpiece side.

15. The system of claim 11 wherein the clamp assembly is rear actuated and further comprises a rod portion operatively coupled to the clamp follower and pivotally attached to a clamp handle such that movement of the clamp handle causes movement of the clamp follower.

16. The system of claim 11 wherein the clamp assembly further comprises a spring operatively coupled to the clamp follower to accommodate variations in workpiece thickness when the clamp follower is in a clamped position with respect to the workpiece.

17. The system of claim 4 further comprising a contact device operatively configured to press against and releasably hold the guide assembly within the portion of the base opening.

18. The system of claim 17 wherein the contact device comprises a locating pin and the guide assembly further comprises an opening adapted to receive the locating pin.

19. The system of claim 1 further comprising a dust catcher securable to the base.

20. The system of claim 1 wherein the base further comprises an attachment point adapted and configured to secure the adjustable holding system to a work surface.

21. The system of claim 1 wherein the base is a fixed base and wherein the system further comprises a support-stop adapted to work in cooperation with the base to support a workpiece adjacent to the base.

22. The system of claim 21 further comprising a track operatively configured to be located adjacent to the base, the support-stop having a securing mechanism for securing to the track such that the support-stop may be consistently positioned adjacent to the base.

* * * * *